(12) United States Patent
Kim et al.

(10) Patent No.: US 9,544,101 B2
(45) Date of Patent: *Jan. 10, 2017

(54) APPARATUS AND METHOD FOR TRANSMITTING/RECEIVING THE HYBRID-ARQ ACK/NACK SIGNAL IN MOBILE COMMUNICATION SYSTEM

(71) Applicant: Samsung Electronics Co., Ltd., Gyeonggi-do (KR)

(72) Inventors: Young-Bum Kim, Seoul (KR); Jin-Kyu Han, Seoul (KR); Hwan-Joon Kwon, Gyeonggi-do (KR); Ju-Ho Lee, Gyeonggi-do (KR); Jianzhong Zhang, Irving, TX (US)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,620

(22) Filed: Oct. 8, 2015

(65) Prior Publication Data

US 2016/0028517 A1    Jan. 28, 2016

Related U.S. Application Data

(60) Continuation of application No. 14/598,798, filed on Jan. 16, 2015, now Pat. No. 9,215,044, which is a
(Continued)

(30) Foreign Application Priority Data

Aug. 21, 2007 (KR) ........................ 10-2007-0083876
Sep. 13, 2007 (KR) ........................ 10-2007-0093321
Jan. 14, 2008 (KR) ........................ 10-2008-0003910

(51) Int. Cl.
*H04L 1/18* (2006.01)
*H04J 11/00* (2006.01)
(Continued)

(52) U.S. Cl.
CPC ............. *H04L 1/1893* (2013.01); *H04B 1/707* (2013.01); *H04J 11/00* (2013.01); *H04L 1/04* (2013.01);
(Continued)

(58) Field of Classification Search
CPC .... H04L 1/1893; H04L 1/1812; H04L 1/1825; H04L 1/1861
(Continued)

(56) References Cited

U.S. PATENT DOCUMENTS 6,075,789 A    6/2000   Kasslin et al.
7,127,661 B2 * 10/2006   Yoon ........................ H04L 1/08
                                                   714/774
(Continued)

FOREIGN PATENT DOCUMENTS

CN          1638527      7/2005
EP          1 646 163    4/2006
(Continued)

OTHER PUBLICATIONS

Motorola, "E-UTRA DL L1/L2 Control Channel Configurations & RE Mapping", R1-073375, 3GPP TSG RAN1 #50, Aug. 16, 2007.
(Continued)

*Primary Examiner* — Joseph D Torres
(74) *Attorney, Agent, or Firm* — The Farrell Law Firm, P.C.

(57) ABSTRACT

An apparatus and method are provided for a mobile communication system. The method includes generating at least one symbol group to which an orthogonal sequence is applied; determining one of a first antenna set and a second antenna set for mapping the generated at least one symbol group based on the a symbol group index and a physical hybrid automatic repeat request indicator channel (PHICH) group index; mapping the generated at least one symbol group index;
(Continued)

group to the determined antenna set; and transmitting the mapped at least one symbol group.

14 Claims, 20 Drawing Sheets

Related U.S. Application Data division of application No. 14/505,150, filed on Oct. 2, 2014, now Pat. No. 9,166,748, which is a continuation of application No. 13/687,628, filed on Nov. 28, 2012, now Pat. No. 8,868,996, which is a continuation of application No. 13/422,626, filed on Mar. 16, 2012, now Pat. No. 8,332,709, which is a continuation of application No. 12/195,865, filed on Aug. 21, 2008, now Pat. No. 8,140,929.

(51) Int. Cl.
*H04L 5/00* (2006.01)
*H04L 1/04* (2006.01)
*H04B 1/707* (2011.01)
*H04W 72/04* (2009.01)
*H04L 27/26* (2006.01)

(52) U.S. Cl.
CPC ........... *H04L 1/1812* (2013.01); *H04L 1/1816* (2013.01); *H04L 1/1825* (2013.01); *H04L 1/1854* (2013.01); *H04L 1/1858* (2013.01); *H04L 1/1861* (2013.01); *H04L 5/0003* (2013.01); *H04L 5/0026* (2013.01); *H04L 5/0044* (2013.01); *H04L 5/0053* (2013.01); *H04L 27/2627* (2013.01); *H04W 72/04* (2013.01); *H04W 72/044* (2013.01); *H04L 5/0092* (2013.01); *H04L 27/2615* (2013.01)

(58) Field of Classification Search
USPC .......................................................... 714/748
See application file for complete search history.

(56) References Cited

U.S. PATENT DOCUMENTS

| | | | |
|---|---|---|---|
| 7,131,038 B2 | 10/2006 | Mitlin et al. | |
| 7,266,752 B2* | 9/2007 | Yoon | H04L 1/08 714/774 |
| 7,636,878 B2* | 12/2009 | Yoon | H04L 1/08 714/774 |
| 7,885,911 B2 | 2/2011 | Cormode et al. | |
| 8,140,929 B2 | 3/2012 | Kim et al. | |
| 8,213,372 B2* | 7/2012 | Kim | H04L 5/0007 370/329 |
| 8,483,164 B2 | 7/2013 | Zhang et al. | |
| 9,166,748 B2 | 10/2015 | Kim et al. | |
| 2002/0141367 A1 | 10/2002 | Hwang et al. | |
| 2003/0105997 A1 | 6/2003 | Mitlin et al. | |
| 2003/0174669 A1 | 9/2003 | Roh et al. | |
| 2005/0068931 A1 | 3/2005 | Cho et al. | |
| 2005/0135329 A1 | 6/2005 | Lee et al. | |
| 2006/0104242 A1 | 5/2006 | Kim et al. | |
| 2007/0254662 A1 | 11/2007 | Khan et al. | |
| 2008/0168333 A1 | 7/2008 | Yamamoto et al. | |
| 2009/0059884 A1 | 3/2009 | Zhang et al. | |
| 2011/0179331 A1 | 7/2011 | Lee et al. | |

FOREIGN PATENT DOCUMENTS

| | | |
|---|---|---|
| EP | 1 816 777 | 2/2007 |
| JP | 2009-049579 | 3/2009 |
| JP | 2010-525721 | 7/2010 |
| JP | 2013-062807 | 4/2013 |
| JP | 5649629 | 1/2015 |
| KR | 1020060053502 | 5/2006 |
| KR | 1020060065790 | 6/2006 |
| RU | 2 272 357 | 3/2006 |
| RU | 2 297 104 | 4/2007 |
| WO | WO 2004/039011 | 5/2004 |
| WO | WO 2007/051186 | 5/2007 |
| WO | WO 2008/041820 | 4/2008 |
| WO | WO 2008/133440 | 11/2008 |
| WO | WO 2008/153331 | 12/2008 |
| WO | WO 2008/153351 | 12/2008 |

OTHER PUBLICATIONS

Samsung, "PHICH/PDCCH to RE Mapping", R1-074773, 3GPP TSG RAN WG1 Meeting #51, Oct. 31, 2007.
Chinese Office Action dated Jun. 10, 2015 issued in counterpart application No. 201310010101.2, 13 pages.
LG Electronics, "Downlink PHICH Structure", R1-073480, 3GPP TSG RAN WG1 #50, Aug. 20-24, 2007, 5 pages.
Japanese Office Action dated Sep. 29, 2015 issued in counterpart application No. 2014-228738, 6 pages.

* cited by examiner

APPARATUS AND METHOD FOR TRANSMITTING/RECEIVING THE HYBRID-ARQ ACK/NACK SIGNAL IN MOBILE COMMUNICATION SYSTEM

PRIORITY

This application is a Continuation of U.S. application Ser. No. 14/598,798, which was filed in the U.S. Patent and Trademark Office on Jan. 16, 2015, which is a Divisional of U.S. application Ser. No. 14/505,150, which was filed in the U.S. Patent and Trademark Office on Oct. 2, 2014, and issued as U.S. Pat. No. 9,166,478 on Oct. 20, 2015, which is a Continuation of U.S. application Ser. No. 13/687,628, which was filed in the U.S. Patent and Trademark Office on Nov. 28, 2012, and issued as U.S. Pat. No. 8,868,996 on Oct. 21, 2014, which is a Continuation of U.S. application Ser. No. 13/422,626, which was filed in the U.S. Patent and Trademark Office on Mar. 16, 2012, and issued as U.S. Pat. No. 8,332,709 on Dec. 11, 2012, and is a Continuation of U.S. application Ser. No. 12/195,865, which was filed in the U.S. Patent and Trademark Office on Aug. 21, 2008, and issued as U.S. Pat. No. 8,140,929 on Mar. 20, 2012, and claims priority under 35 U.S.C. §119(a) to Korean Patent Application Serial Nos. 10-2007-0083876, 10-2007-0093321, and 10-2008-0003910, which were filed in the Korean Intellectual Property Office on Aug. 21, 2007, Sep. 13, 2007, and Jan. 14, 2008, respectively, the disclosures of all of which are incorporated herein by reference.

BACKGROUND OF THE INVENTION

1. Field of the Invention

The present invention relates to an apparatus and method for transmitting and receiving an Acknowledge/Negative acknowledge (ACK/NACK) signal supporting Hybrid Automatic Repeat reQuest (HARQ) in a mobile communication system.

2. Description of the Related Art

Currently, in mobile communication systems, intensive research is being conducted on Orthogonal Frequency Division Multiple Access (OFDMA) or Single Carrier-Frequency Division Multiple Access (SC-FDMA) as a potential scheme for high-speed data transmission on wireless channels.

$3^{rd}$ Generation Partnership Project (3GPP), a standard group for asynchronous cellular mobile communication, is studying Long Term Evolution (LTE) or an Evolved Universal Terrestrial Radio Access (E-UTRA) system, which is the next-generation mobile communication system, based on the above-stated multiple access scheme.

The multiple access scheme allocates and manages time-frequency resources on which data or control information is transmitted for each user without overlapping each other, i.e., orthogonality is maintained for the time-frequency resources in order to distinguish data or control information of each user. For a control channel, the multiple access scheme can additionally allocate code resources for distinguishing control information of each user.

FIG. 1 is a diagram illustrating a transmission structure on a time-frequency domain for data or control channels transmitted over a DownLink (DL) in an LTE system to which the present invention is applied.

In FIG. 1, the vertical axis represents a time domain, and the horizontal axis represents a frequency domain. The minimum transmission unit in the time domain is an OFDM symbol. $N_{symb}$ OFDM symbols 102 are included in one slot 106 and two slots are included in one subframe. A length of the slot is 0.5 ms, and a length of the subframe is 1.0 ms. The minimum transmission unit in the frequency domain is a subcarrier, and the entire system transmission band includes a total of $N_{BW}$ subcarriers 104.

In the time-frequency domain, the basic unit of wireless resources is a Resource Element (RE) 112, which can be represented by an OFDM symbol index and a subcarrier index. A Resource Block (RB) 108 is defined by $N_{symb}$ consecutive OFDM symbols 102 in the time domain, and $N_{RB}$ consecutive subcarriers 110 in the frequency domain. Therefore, one RB 108 includes $N_{symb}*N_{RB}$ REs 112. Generally, the minimum transmission unit of data is the RB. In the current LTE system, $N_{symb}=7$, $N_{RB}=12$, and $N_{BW}$ has a value that is proportional to the system transmission band.

It is assumed that control information is transmitted within first N OFDM symbols in a subframe. Presently, a maximum of 3 is considered as a value of N. Therefore, a value of N varies according to the amount of control information to be transmitted on a subframe.

The control information includes an indicator of the number of OFDM symbols over which the control information is transmitted, UpLink (UL) or DL scheduling information, an ACK/NACK signal, and Multiple Input Multiple Output (MIMO)-related control information.

HARQ is an important technology used for increasing reliability and data throughput of data transmission in a packet-based mobile communication system. HARQ refers to a combined technology of an Automatic Repeat reQuest (ARQ) technology and a Forward Error Correction (FEC) technology.

ARQ refers to a technology in which a transmitter assigns sequence numbers to data packets according to a predetermined scheme and transmits the data packets. A receiver requests the transmitter to retransmit missing packet(s) among the received packets using the sequence numbers, thereby achieving reliable data transmission.

FEC refers to a technology for adding redundant bits to transmission data before transmission, such as the convolutional coding or turbo coding, to cope with an error occurring in the noise or fading environment during the data transmission/reception process, thereby decoding the originally transmitted data.

In a system using HARQ, a receiver decodes received data through an inverse FEC process, and determines if the decoded data has an error through Cyclic Redundancy Check (CRC) check. If there is no error, the receiver feeds back an ACK to the transmitter, so that the transmitter can transmit the next data packet. However, if there is an error, the receiver feeds back a NACK to the transmitter, thereby requesting retransmission of the previously transmitted packet. Through the above process, the receiver combines the previously transmitted packet with the retransmitted packet, thereby obtaining energy gain and improved reception performance.

FIG. 2 is a diagram illustrating an example of data transmission by HARQ to which the present invention is applied.

Referring to FIG. 2, the horizontal axis represents the time domain. Reference numeral 201 represents an initial data transmission. A data channel is a channel over which data is actually transmitted. A receiver, receiving data transmission 201, attempts demodulation on the data channel. In this process, if it is determined that the data transmission fails in successful demodulation, the receiver feeds back a NACK 202 to a transmitter. Upon receipt of the NACK 202, the transmitter performs retransmission on the initial transmission 201, i.e., a first retransmission 203. Therefore, data channels in the initial transmission 201 and the first retransmission 203 transmit the same information. Even though the data channels transmit the same information, they may have different redundancies.

Upon receipt of the data transmission 203, the receiver performs combining on the retransmission 203 with the initial transmission 201 data, and attempts demodulation of the data channel depending on the combining result. If it is determined that the data transmission fails to successfully demodulate, the receiver feeds back a NACK 204 to the transmitter. Upon receipt of the NACK 204, the transmitter performs a second retransmission 205, a predetermined time period after the time of the first retransmission 203. Therefore, data channels for the initial transmission 201, the first retransmission 203, and the second retransmission 205 all transmit the same information.

Upon receiving data of the second retransmission 205, the receiver combines the initial transmission 201, the first retransmission 203, and the second retransmission 205, and demodulates the data channel. If it is determined that the data transmission is successfully demodulated, the receiver feeds back an ACK 206 to the transmitter.

Upon receipt of the ACK 206, the transmitter performs another initial transmission 207 on the next data. The initial transmission 207 can be immediately performed when the ACK 206 is received, or can be performed after a lapse of a certain time, depending on the scheduling result.

In order to support HARQ, the receiver should transmit an ACK/NACK, or feedback information, to the transmitter. A channel used for transmitting the ACK/NACK is called a Physical HARQ Indicator Channel (PHICH).

When such communication environments are taken into consideration, there is a need for a detailed description as to how the system using HARQ will transmit an ACK/NACK signal in connection with data transmission. In particular, there is a need for a detailed scenario as to how an FDMA-based mobile communication system will transmit ACK/NACK signals for a plurality of users within first N OFDM symbols in a subframe, i.e., there is a demand for an ACK/NACK signal transmission and reception scheme in which HARQ is supported and orthogonality is guaranteed for a plurality of users in the time-frequency domain.

SUMMARY OF THE INVENTION

Accordingly, the present invention has been designed to solve the above and other problems occurring in the prior art, and the present invention provides an apparatus and method for transmitting and receiving an ACK/NACK signal supporting Hybrid Automatic Repeat reQuest (HARQ) in a mobile communication system.

Further, the present invention provides an apparatus and method for mapping a plurality of HARQ ACK/NACK signals to at least one OFDM symbol before transmission and reception in a mobile communication system.

Further, the present invention provides an apparatus for distributing CDM segments for a plurality of ACK/NACK signals within OFDM symbols, before transmission and reception in a mobile communication system.

Further, the present invention provides a method for repeatedly transmitting and receiving a plurality of ACK/NACK signals through at least one OFDM symbol in a mobile communication system including a transmitter and a receiver.

Further, the present invention provides a method for transmitting and receiving HARQ ACK/NACK signals through two OFDM symbols by varying a mapping pattern based on the number of used antennas in a mobile communication system including a transmitter and a receiver.

Further, the present invention provides an HARQ ACK/NACK mapping method for repeatedly transmitting and receiving HARQ ACK/NACK signals through two OFDM symbols, three times, in a mobile communication system including a transmitter and a receiver.

In accordance with an aspect of the present invention, a method is provided for a mobile communication system. The method includes generating at least one symbol group to which an orthogonal sequence is applied; determining one of a first antenna set and a second antenna set for mapping the generated at least one symbol group based on the a symbol group index and a physical hybrid automatic repeat request indicator channel (PHICH) group index; mapping the generated at least one symbol group to the determined antenna set; and transmitting the mapped at least one symbol group.

In accordance with another aspect of the present invention, an apparatus is provided for a mobile communication system. The apparatus includes a controller for generating at least one symbol group to which an orthogonal sequence is applied, determining one of a first antenna set and a second antenna set for mapping the at least one symbol group based on the a symbol group index and a physical hybrid automatic repeat request indicator channel (PHICH) group index, and mapping the generated at least one symbol group to the determined antenna set; and a transmitter for transmitting the mapped at least one symbol group.

BRIEF DESCRIPTION OF THE DRAWINGS

The above and other aspects, features, and advantages of certain embodiments of the present invention will become more apparent from the following detailed description when taken in conjunction with the accompanying drawings in which.

DETAILED DESCRIPTION OF EMBODIMENTS OF THE INVENTION

Various embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operator intention, or usual practices. Therefore, the definition of the terms should be made based on contents throughout the specification.

A description will now be made of a transmission/reception operation of a Node B (or Base Station) and a User Equipment ((UE) or Mobile Station) for transmitting control information, specifically, ACK/NACK signals supporting HARQ, in an FDMA-based mobile communication system.

Figure 1:
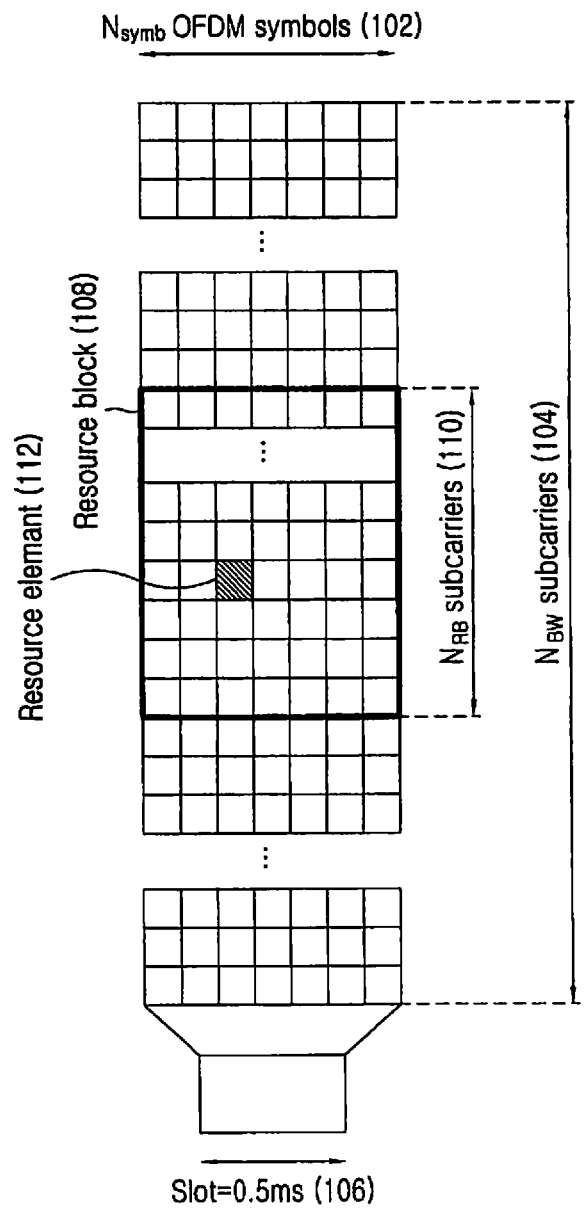
FIG. 1 is a diagram illustrating time-frequency domain resources for data or control channels in an LTE system to which the present invention is applied.
Figure 2:
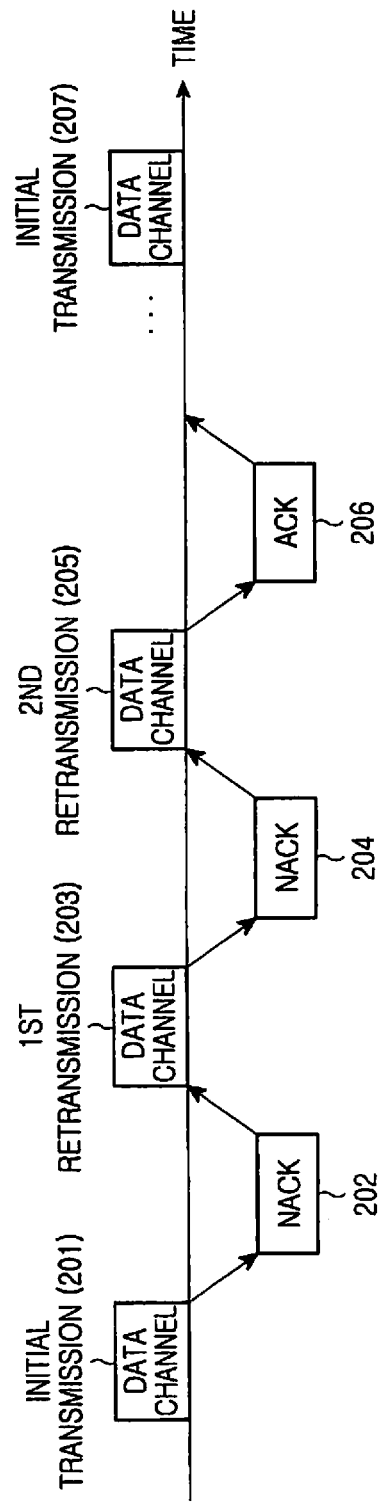
FIG. 2 is a diagram illustrating a transmission process for data and ACK/NACK signals based on HARQ to which the present invention is applied.
Figure 3:
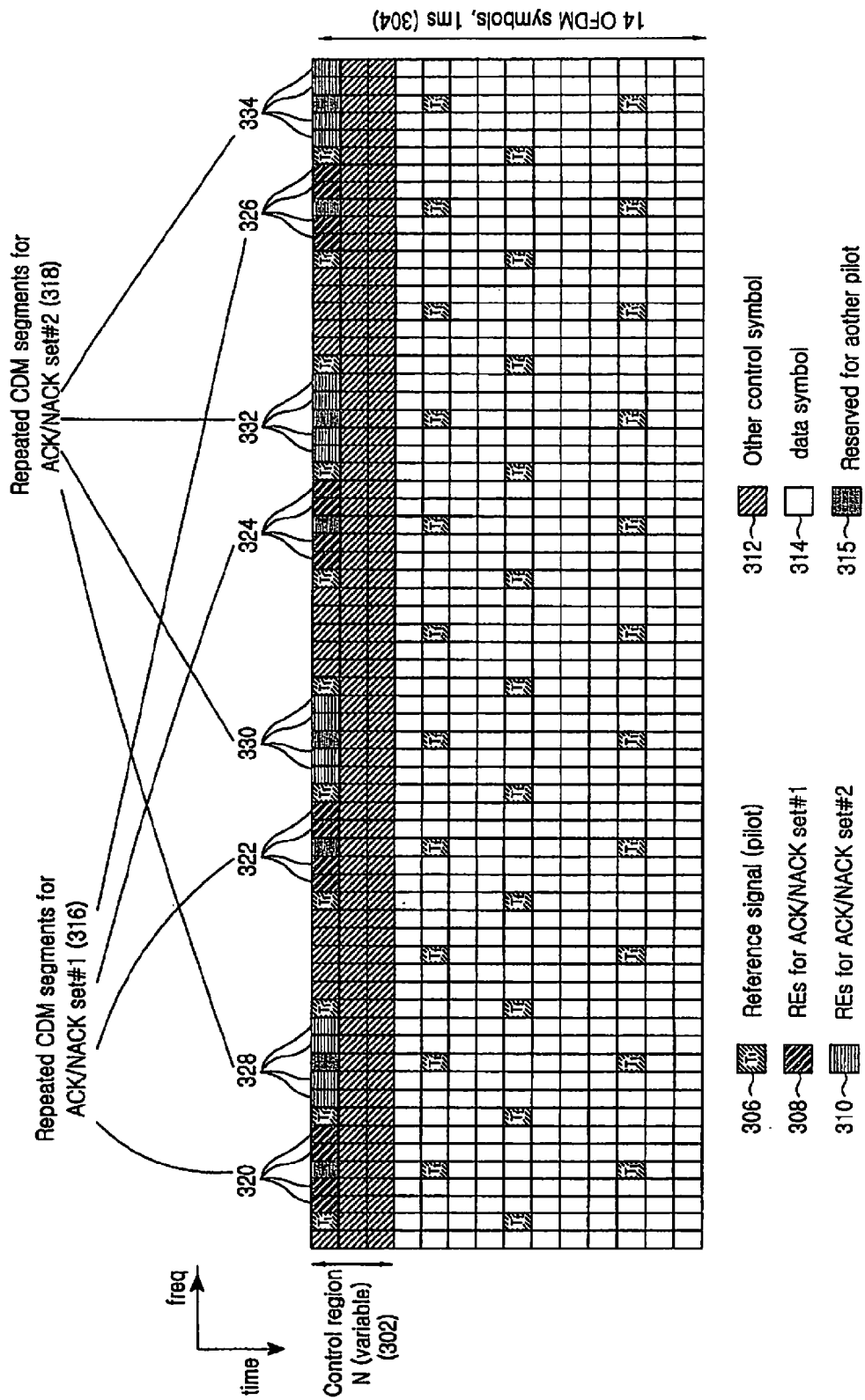
FIG. 3 is a diagram illustrating a transmission structure for DL ACK/NACK signals in an LTE system according to the present invention.

FIG. 3 is a diagram illustrating a transmission structure for DL ACK/NACK signals in a current LTE system to which the present invention is applied.

Referring to FIG. 3, the LTE system uses the time-frequency resources and also code resources in order to distinguish an ACK/NACK signal of each user. The ACK/NACK signal, 1-bit of information, notifies an ACK or NACK. When the ACK/NACK signal is spread, 'number of bits of ACK/NACK signal'*'spreading factor (SF)' chips are generated, and before transmission, the generated chips are mapped to Code Division Multiplexing (CDM) segments for ACK/NACK transmission.

The CDM segment, a resource unit including consecutive REs in the time-frequency domain, is characterized in that it is robust against interference signals and restricts performance degradation of orthogonal codes due to the frequency-selective characteristic of wireless channels. In addition, for reception performance improvement through additional diversity gain, the CDM segment is repeatedly transmitted on the frequency domain a predetermined number of times. A repetition (number of repetitions) for the CDM segment is determined considering a desired diversity gain and wireless resource overhead.

A size of one CDM segment is equal to a size of the generated chip, and the number of ACK/NACK signals to which the CDM segment can be multiplexed is equal to the SF. The above transmission scheme is called a "hybrid FDM/CDM scheme".

The number of OFDM symbols, to which the ACK/NACK signal is mapped and transmitted, as described above, cannot exceed first N OFDM symbols in a subframe on which control information is transmitted. In this context, for a value of N, 1 or 3 is now considered.

For N=1, when a user is located a shorter distance from a Node B, it is sufficient to satisfy predefined reception reliability of an ACK/NACK signal even though the ACK/NACK signal is transmitted over one OFDM symbol. On the other hand, when a user is located a longer distance from the Node B, it is insufficient for a transmission interval of an ACK/NACK signal to satisfy the predefined reception reliability only with one OFDM symbol (N=1), and the ACK/NACK signal is transmitted over three OFDM symbols (N=3).

It is assumed in FIG. 3 that an ACK/NACK signal for each user is transmitted within the first OFDM symbol in the subframe, i.e., using the same frequency resource, for N=1. In this case, ACK/NACK signals for 4 users are spread with a spreading factor 4 (SF=4) corresponding to the number of ACK/NACK signals mapped to the CDM segments, use the same time-frequency resources, and are distinguished using different length-4 orthogonal codes.

That is, in the example of FIG. 3, an ACK/NACK signal #1 for user #1, an ACK/NACK signal #2 for user #2, an ACK/NACK signal #3 for user #3, and an ACK/NACK signal #4 for user #4 are spread with different SF=4 orthogonal codes, and then repeatedly mapped to 4 CDM segments 320, 322, 324, and 326 before transmission. Similarly, an ACK/NACK signal #5 for user #5, an ACK/NACK signal #6 for user #6, and an ACK/NACK signal #7 for user #7, and an ACK/NACK signal #8 for user #8 are spread with different SF=4 orthogonal codes, and then repeatedly mapped to 4 CDM segments 328, 330, 332, and 334 before transmission. Here, the CDM segments are made such that pilot signals (also known as Reference Signal (RS)) for channel estimation should not overlap with other control signals except for ACK/NACK.

In the exemplary case of FIG. 3, CDM segments are created with the location of additional pilot signals 315 for a system operating a plurality of transmit antennas taken into consideration. The repeated CDM segments 316 and 318 are equal in size.

As to an interval between the CDM segments, which are repeatedly transmitted on the frequency domain a predetermined number of times, the CDM segments should be created such that they are spaced as far from each other as possible, in order to maximize frequency diversity. Therefore, when a transmission interval of an ACK/NACK signal cannot satisfy a predefined reception reliability of the ACK/NACK signal only with one OFDM symbol because a user is located a longer distance from a Node B, because the ACK/NACK signal should be dispersedly transmitted over a 3-OFDM symbol interval, there is a need for a detailed definition of a method for mapping CDM segments to OFDM symbols. Accordingly, the present invention provides a detailed method for mapping CDM segments for ACK/NACK signals to at least one OFDM symbol. In addition, the present invention provides a rule based for distributing and transmitting ACK/NACK signals for a plurality of users for an available OFDM symbol interval.

Figure 4:
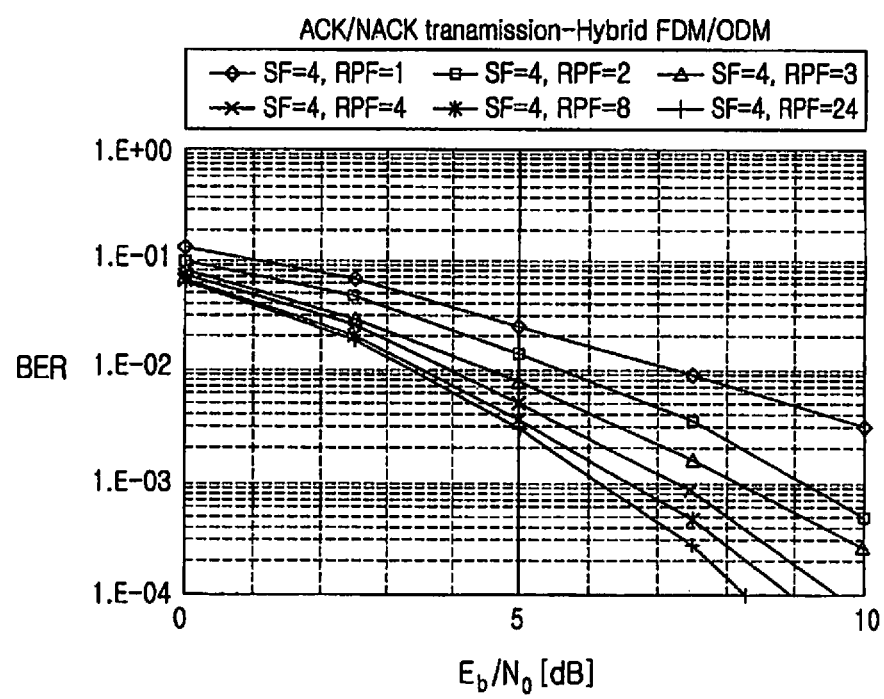
FIG. 4 is a diagram illustrating simulation results on an ACK/NACK signal based on a repetition of CDM segments in an OFDM system.

FIG. 4 is a diagram illustrating simulation results based on a repetition of CDM segments when an OFDM system transmits ACK/NACK signals using one transmit antenna.

This simulation shows a received bit energy-to-noise ratio $E_b/N_0$ versus a Bit Error Rate (BER) when a length of orthogonal codes is 4 and a repetition is 1, 2, 3, 4, 8, and 24, in a fading channel environment where a user moves, for example, at 3 km/h. As a whole, it is shown that an increase in repetition contributes to performance improvement where a value of $E_b/N_0$ necessary for obtaining the same BER is reduced, and an increase in repetition reduces the performance improvement. Therefore, given the BER performance and the limited resources, it is preferable to repeat the CDM segments four times, for system design.

The number of first N OFDM symbols in a subframe on which control information is transmitted varies according to the amount of desired transmission control information at every subframe. The control information includes a Control Channel Format Indicator (CCFI) indicating the number of OFDM symbols over which control information is transmitted, UL/DL scheduling information, ACK/NACK signal, etc. The CCFI is transmitted in the first OFDM symbol to notify a transmission interval N of control information. UL/DL scheduling information disperses the control information over the notified-N OFDM symbols to obtain a diversity effect. In the current LTE system, a maximum of 3 can apply as a value of the transmission interval N, and the possible number of OFDM symbols to which the ACK/NACK signals are mapped and transmitted is 1 or 3, as described above.

The present invention provides a detailed method for mapping CDM segments to OFDM symbols when dispersedly transmitting ACK/NACK signals for a 3-OFDM symbol interval.

Further, the present invention defines a mapping method such that power between OFDM symbols to which ACK/NACK signals are mapped is uniformly dispersed, if possible, thereby preventing the situation where a particular OFDM symbol is overloaded. That is, at an arbitrary instant, the maximum transmit power of a Node B should be maintained below a predetermined value due to the restriction of a Node B power amplifier, and the Node B should consider the above matters even when mapping CDM segments for transmitting ACK/NACK signals to OFDM symbols.

CCFI, which is an indicator indicating the number of OFDM symbols over which control information is transmitted, is always mapped to the first OFDM symbol in the subframe during its transmission, and because the CCFI requires a higher reception reliability, its transmit power is generally relatively high. Therefore, ACK/NACK CDM segments for ACK/NACK signal transmission are created such that, if possible, they are less frequently mapped to the OFDM symbol to which the CCFI is mapped and transmitted, thereby preventing the first OFDM symbol to be overloaded.

First Embodiment

A first embodiment of the present invention considers a situation in which an ACK/NACK signal is spread with a spreading factor 4 and mapped to a CDM segment, the CDM segment is repeated 4 times, and the ACK/NACK signal is transmitted during the first 1 or 3 OFDM symbols in a subframe.

Figure 5:
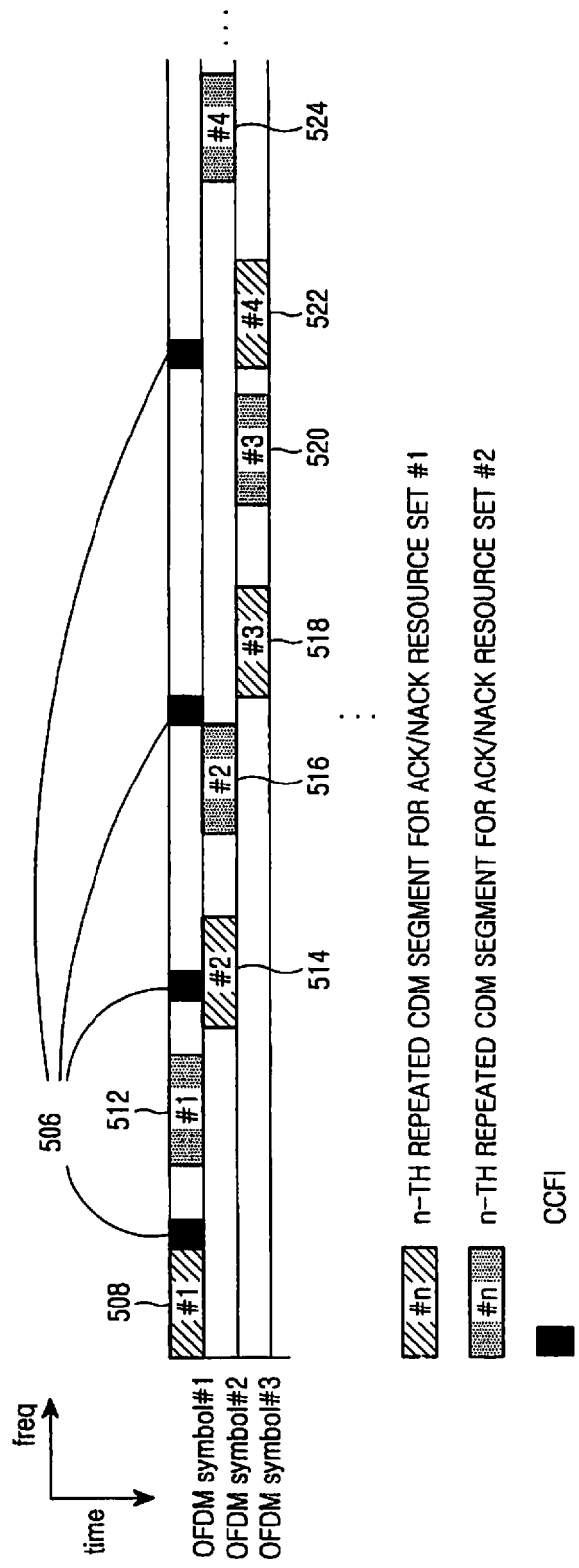
FIG. 5 is a diagram illustrating a CDM segment mapping method for ACK/NACK signal transmission according to a first embodiment of the present invention.

FIG. 5 is a diagram illustrating a CDM segment mapping method for ACK/NACK signal transmission according to a first embodiment of the present invention. For convenience, only CCFIs and ACK/NACK signals are shown. Other UL/DL scheduling information and pilot signals (or RSs) are not shown.

Referring to FIG. 5, reference numeral 506 identifies where the CCFI is mapped to the first OFDM symbol, and repeatedly transmitted in the frequency domain in order to obtain additional diversity gain. In the case where according to the simulation results of FIG. 4, CDM segments are repeated 4 times, and mapped to the first 3 OFDM symbols in one subframe, the method divides resources for ACK/NACK transmission into two types: set #1 and set #2. Herein, a set of CDM segments that are repeated 4-times is called a "CDM segment set", and the CDM segment set is an element included in a resource set #1 for ACK/NACK transmission or a resource set #2 for ACK/NACK transmission.

The resource set #1 for ACK/NACK transmission represents resources for ACK/NACK transmission, provided for once mapping a CDM segment to which an ACK/NACK signal, intended to be transmitted to a particular UE, is mapped after being spread, to the first OFDM symbol for ACK/NACK signal transmission (508), once mapping the CDM segment to the second OFDM symbol for ACK/NACK signal transmission (514), and twice mapping the CDM segment to the third OFDM symbol for ACK/NACK signal transmission (518 and 522).

The resource set #2 for ACK/NACK transmission represents resources for ACK/NACK transmission, provided for once mapping a CDM segment to which an ACK/NACK signal, intended to be transmitted to another UE, is mapped after being spread, to the first OFDM symbol for ACK/NACK signal transmission (512), twice mapping the CDM segment to the second OFDM symbol for ACK/NACK signal transmission (516 and 524), and once mapping the CDM segment to the third OFDM symbol for ACK/NACK signal transmission (520).

The ACK/NACK CDM segments mapped to each OFDM symbol in each set are created such that they do not overlap each other in the frequency domain, thereby maximally obtaining a frequency diversity effect. Different frequencies can be used for ACK/NACK signal multiplexing between the resource set #1 for ACK/NACK transmission and the resource set #2 for ACK/NACK transmission.

Because one CDM segment set can distinguish a maximum of 4 ACK/NACK signals by orthogonal codes, a plurality of CDM segment sets are defined and managed in order to multiplex a plurality of ACK/NACK signals. The plurality of CDM segment sets are defined such that they are uniformly distributed and included in each of the resource sets for ACK/NACK transmission.

As the CDM segment sets are uniformly distributed to each of the resource sets for ACK/NACK transmission, information indicating which resource set for ACK/NACK transmission and CDM segment set the UE should monitor in order to receive the ACK/NACK signal from a Node B is implicitly notified by a mapping relation with scheduling control information without separate signaling, or notified by separate physical layer or upper layer signaling.

Figure 6:
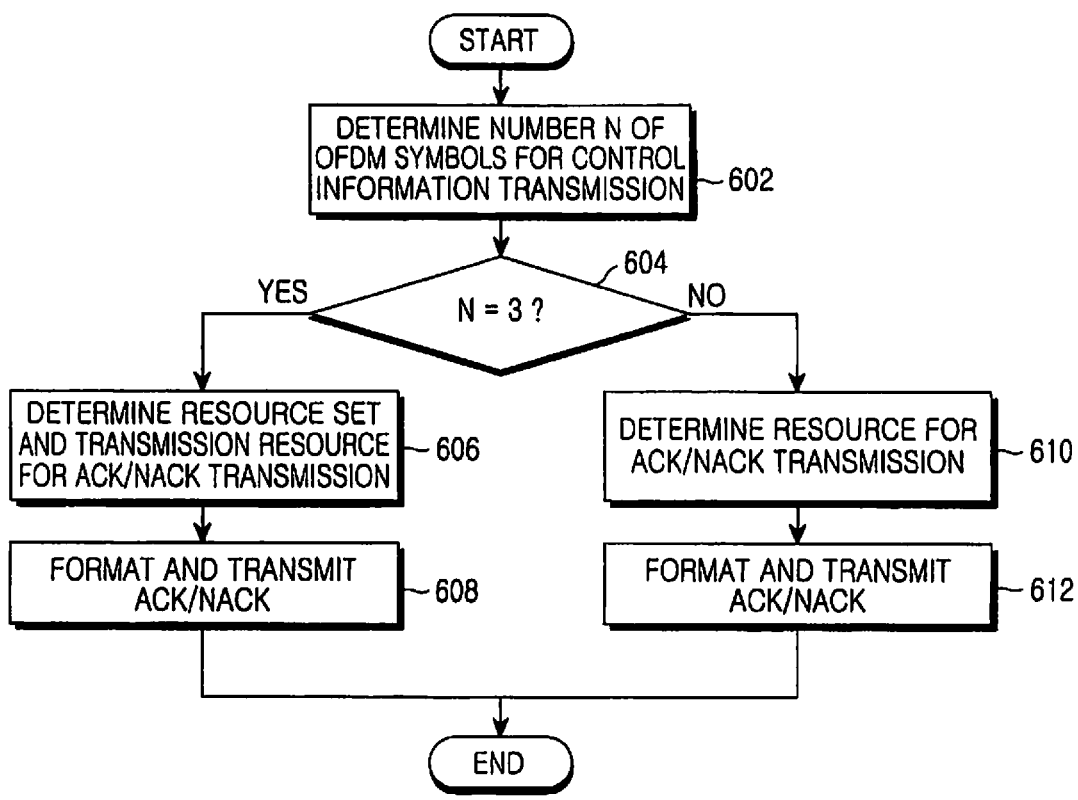
FIG. 6 is a diagram illustrating a transmission procedure for an ACK/NACK signal in a Node B according to the first embodiment of the present invention.

FIG. 6 is a diagram illustrating a transmission procedure for an ACK/NACK signal in a Node B according to the first embodiment of the present invention.

Referring to FIG. 6, in step 602, a Node B determines the number N of OFDM symbols for control information transmission of a subframe to which the currently desired transmission ACK/NACK signal belongs, in order to transmit the ACK/NACK signal. A value of N is proportional to the amount of control information that the Node B desires to transmit in a subframe.

In step 604, the Node B determines if the number N of OFDM symbols is equal to 3.

If the number of OFDM symbols is 3, in step 606, the Node B determines a size of a CDM segment, a predefined resource set for ACK/NACK transmission, and a CDM segment set in the resource set for ACK/NACK transmission, as resources for ACK/NACK transmission. The size of the CDM segments is a value for maintaining orthogonality between ACK/NACK signals multiplexed to CDM segments, and a fixed value is generally used. In addition, the CDM segments are created such that they do not overlap each other in the frequency domain, thereby maximally obtaining frequency diversity gain. Further, the Node B determines resources for ACK/NACK transmission such that power overload may not occur in a particular OFDM symbol among the OFDM symbols for ACK/NACK transmission. The determined resources for ACK/NACK transmission are implicitly notified to a UE in association with transmission resources to which scheduling information transmitted together with ACK/NACK is mapped, or notified to a UE through separate physical layer or upper layer signaling.

In step 608, the Node B generates an ACK/NACK signal according to the presence or absence of an error in the data received from a UE, spreads the generated ACK/NACK signal, maps it to a CDM segment, and then repeatedly transmits the CDM segment four times in the frequency domain in order to obtain frequency-domain diversity gain. The 4-times repeated CDM segments are mapped to the ACK/NACK signal transmission resources determined in step 606.

However, if it is determined in step 604 that the number of OFDM symbols is not 3, in step 610, the Node B determines a size of a CDM segment and a location where the CDM segment is mapped in the frequency domain, as resources for ACK/NACK transmission.

In step 612, the Node B generates an ACK/NACK signal according to the presence or absence of an error in the data received from a UE, spreads the generated ACK/NACK signal, maps it to a CDM segment, and then repeatedly transmits the CDM segment four times in the frequency domain in order to obtain frequency-domain diversity gain. The 4-times repeated CDM segments are mapped to the resources for ACK/NACK transmission determined in step 610.

Figure 7:
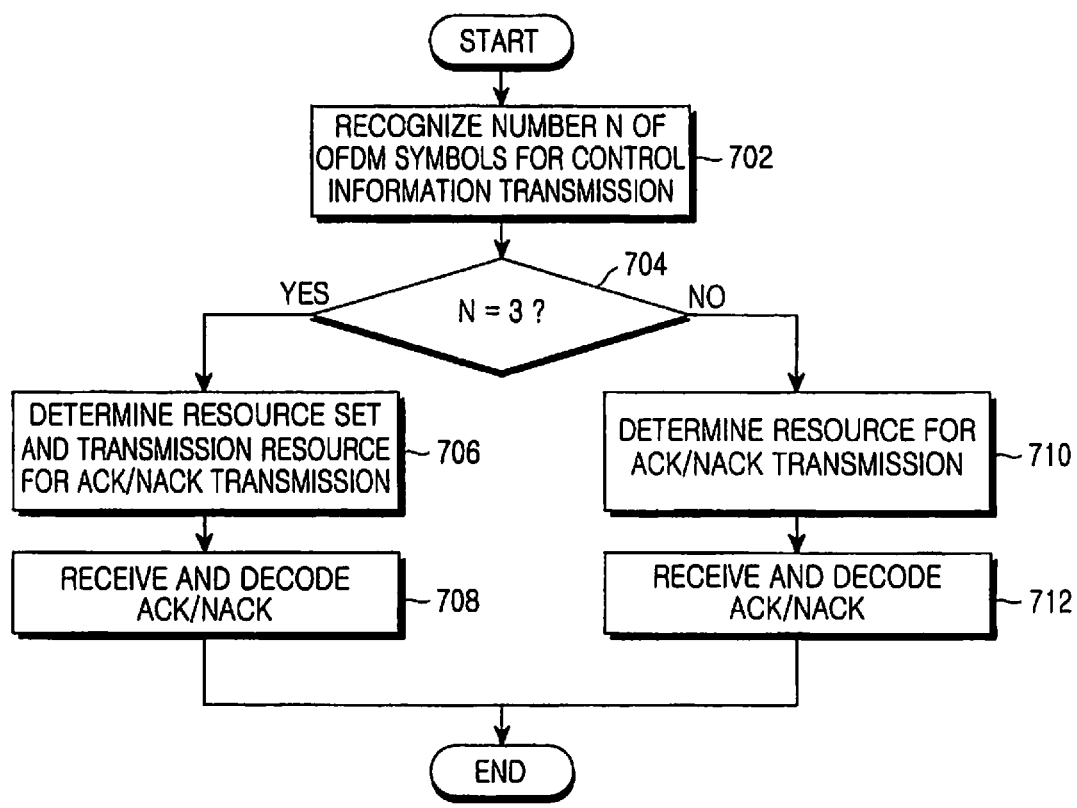
FIG. 7 is a diagram illustrating a reception procedure for an ACK/NACK signal in a UE according to the first embodiment of the present invention.

FIG. 7 is a diagram illustrating a reception procedure for an ACK/NACK signal in a UE according to the first embodiment of the present invention. The reception procedure in a UE corresponds to an inverse process of the Node B transmission procedure illustrated in FIG. 6.

Referring to FIG. 7, in step 702, a UE recognizes the number N of OFDM symbols for control information transmission by a Node B, or its equivalent information, through signaling. The information can be acquired through CCFI information transmitted from the Node B.

In step 704, the UE determines if the number N of OFDM symbols is equal to 3.

If it is determined in step 704 that the number of OFDM symbols is 3, in step 706 the UE determines with which CDM segment set the Node B has transmitted an ACK/NACK signal, among the resource sets for ACK/NACK transmission, defined for N=3.

The UE can determine the CDM segment by detecting the transmission resources of the scheduling control information received together with an ACK/NACK signal, or signaling made through a physical layer and/or upper layer.

In step 708, the UE extracts an ACK/NACK signal from each CDM segment to which the ACK/NACK signal is mapped, despreads it, combines the despread ACK/NACK signal with a signal despread after being extracted from each CDM segment, and performs decoding thereon.

However, if it is determined in step 704 that a value of N is not 3, in step 710, the UE determines with which CDM segment set the Node B has transmitted an ACK/NACK signal, among the resource sets for ACK/NACK transmission, defined for N≠3. The UE can determine the CDM segment by detecting the transmission resources of the scheduling control information received together with an ACK/NACK signal, or signaling made through a physical layer and/or upper layer. In step 712, the UE extracts an ACK/NACK signal from each CDM segment to which the ACK/NACK signal is mapped, despreads it, combines the despread ACK/NACK signal with a signal despread after being extracted from each CDM segment, and performs decoding thereon.

Figure 8:
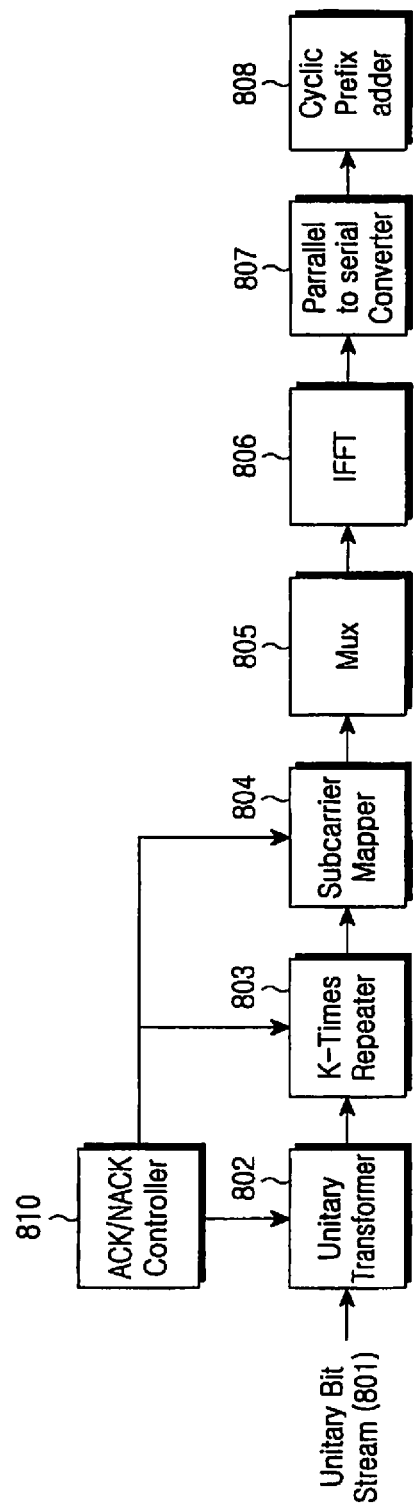
FIG. 8 is a diagram illustrating a structure of a transmission apparatus for an ACK/NACK signal according to the present invention.

FIG. 8 is a diagram illustrating a structure of a transmission apparatus for an ACK/NACK signal according to an embodiment of the present invention.

Referring to FIG. 8, a value of an ACK/NACK signal 801 is determined according to whether demodulation of the data a Node B received from each UE is successful, or retransmission is required due to failure in the demodulation. The ACK/NACK signal 801 is input to a unitary transformer 802 where it is transformed into an orthogonal signal. An ACK/NACK controller 810 determines a size of the unitary transformer 802, a repetition K in the frequency domain, and a repetition location, and controls the unitary transformer 802, a K-times repeater 803, and a subcarrier mapper 804. The size of the unitary transformer 802 is equal to a size of the CDM segment for ACK/NACK transmission, and is determined as a spreading factor having a predetermined size so as to maintain orthogonality between ACK/NACK signals multiplexed in the CDM segment for ACK/NACK transmission. Therefore, the unitary transformer 802 receives as many ACK/NACK signals as the maximum size of the CDM segment for ACK/NACK transmission, and transforms them into orthogonal signals. The transformed output signals constitute a CDM segment of the ACK/NACK signals. For example, the unitary transformer 802 can use a Walsh transform or a Discrete Fourier Transform (DFT) as a transform operation for maintaining orthogonality between input signals.

The K-times repeater 803 K-times repeats the ACK/NACK signal, which is transformed into an orthogonal signal by the unitary transformer 802, in units of CDM segments in order to acquire frequency domain diversity. The repetition is adjusted by the ACK/NACK controller

810, and it is previously defined between a Node B and a UE, or recognized in common through signaling. The first embodiment of the present invention is described for K=4 as an example.

The subcarrier mapper 804 generates the input signal received from the K-times repeater 803 according to the CDM segment. The K-times repeated location is adjusted by the ACK/NACK controller 810, and it is determined according to the number of OFDM symbols for ACK/NACK transmission. The number of OFDM symbols is determined according to the amount of desired transmission control information and the channel state of a UE that intends to receive an ACK/NACK signal, or to the UE location in the cell. If the number of OFDM symbols for ACK/NACK transmission is determined as 3, the Node B determines resources for ACK/NACK transmission such that power overload may not occur in a particular OFDM symbol among the OFDM symbols for ACK/NACK transmission.

As illustrated in FIG. 5, the first preferred embodiment of the present invention defines resource sets for ACK/NACK transmission as a set #1 and a set #2, so that ACK/NACK signals for individual UEs should be uniformly distributed on the resource sets for ACK/NACK transmission. The resource set #1 for ACK/NACK transmission has a property that a CDM segment is once mapped to the first OFDM symbol, once mapped to the second OFDM symbol, and twice mapped to the third OFDM symbol. The resource set #2 for ACK/NACK transmission has a property that CDM segment is once mapped to the first OFDM symbol, twice mapped to the second OFDM symbol, and once mapped to the third OFDM symbol.

If the number of OFDM symbols for ACK/NACK transmission is determined as 1, the Node B repeatedly maps the CDM segment four times to the first OFDM symbol in a subframe on which the ACK/NACK signal is transmitted.

A multiplexer 805 multiplexes the ACK/NACK signal with other control information, a pilot signal, and data. The multiplexed signal is then transformed into a time-domain signal by Inverse Fast Fourier Transform (IFFT) 806. An output signal of the IFFT 806 is converted into a serial signal in a parallel-to-serial converter 807. Thereafter, a Cyclic Prefix (CP) for prevention of inter-symbol interference is added to the serial signal in a CP inserter 808, and then the signal is transmitted.

Figure 9:
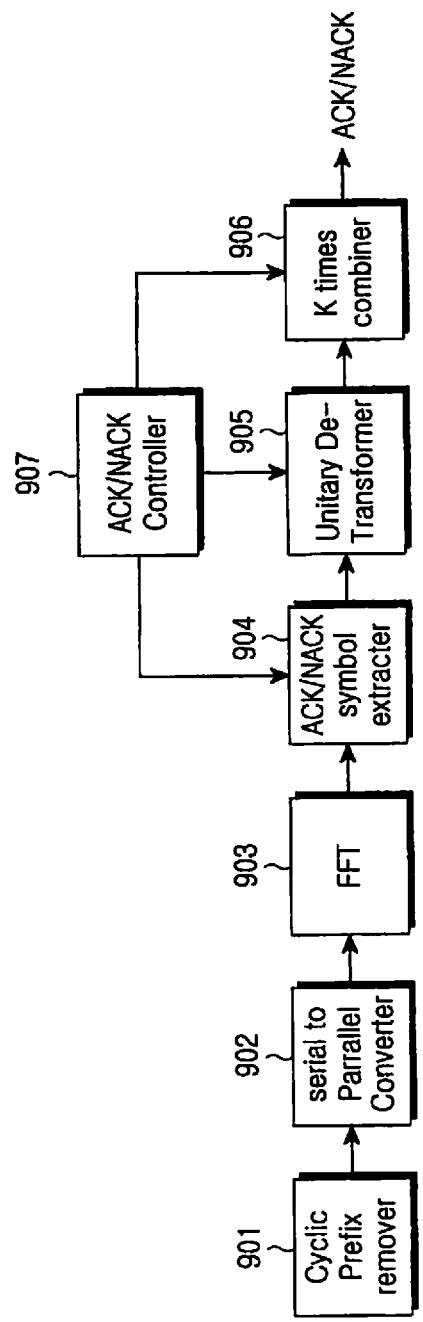
FIG. 9 is a diagram illustrating a structure of a reception apparatus for an ACK/NACK signal according to the present invention.

FIG. 9 is a diagram illustrating a structure of a reception apparatus for an ACK/NACK signal according to a preferred embodiment of the present invention.

Referring to FIG. 9, in a UE, a CP remover 901 removes a CP from a received signal from a Node B, and a serial-to-parallel converter 902 converts the CP-removed signal into a parallel signal. The parallel signal is transformed into a frequency-domain signal by a Fast Fourier Transform (FFT) block 903. An ACK/NACK symbol extractor 904 extracts an ACK/NACK symbol from the location of the time-frequency resources to which the ACK/NACK symbol is mapped in the frequency-domain signal output from the FFT 903. The location of time-frequency resources to which the ACK/NACK symbol is mapped is acquired by an ACK/NACK controller 907.

A unitary de-transformer 905 K times receives an output signal corresponding to a CDM segment from the ACK/NACK symbol extractor 904 in units of CDM segments, and performs unitary de-transform thereon. A K-times combiner 906 performs K-times combining on the output of the unitary de-transformer 905.

The ACK/NACK controller 907 determines information indicating the number of OFDM symbols over which an ACK/NACK signal is transmitted, a repetition location of the CDM segment, a size of the unitary de-transformer 905, and a repetition K of the CDM segment, and controls the ACK/NACK symbol extractor 904, the unitary de-transformer 905, and the K-times combiner 906 depending thereon. Therefore, the UE finally acquires an ACK/NACK signal from the combined signal.

Second Embodiment

A second embodiment of the present invention considers where an ACK/NACK signal is spread with a spreading factor 4 and mapped to a CDM segment, the CDM segment is repeated 3 times, and the ACK/NACK signal is transmitted during first 2 OFDM symbols in a subframe.

Figure 10:
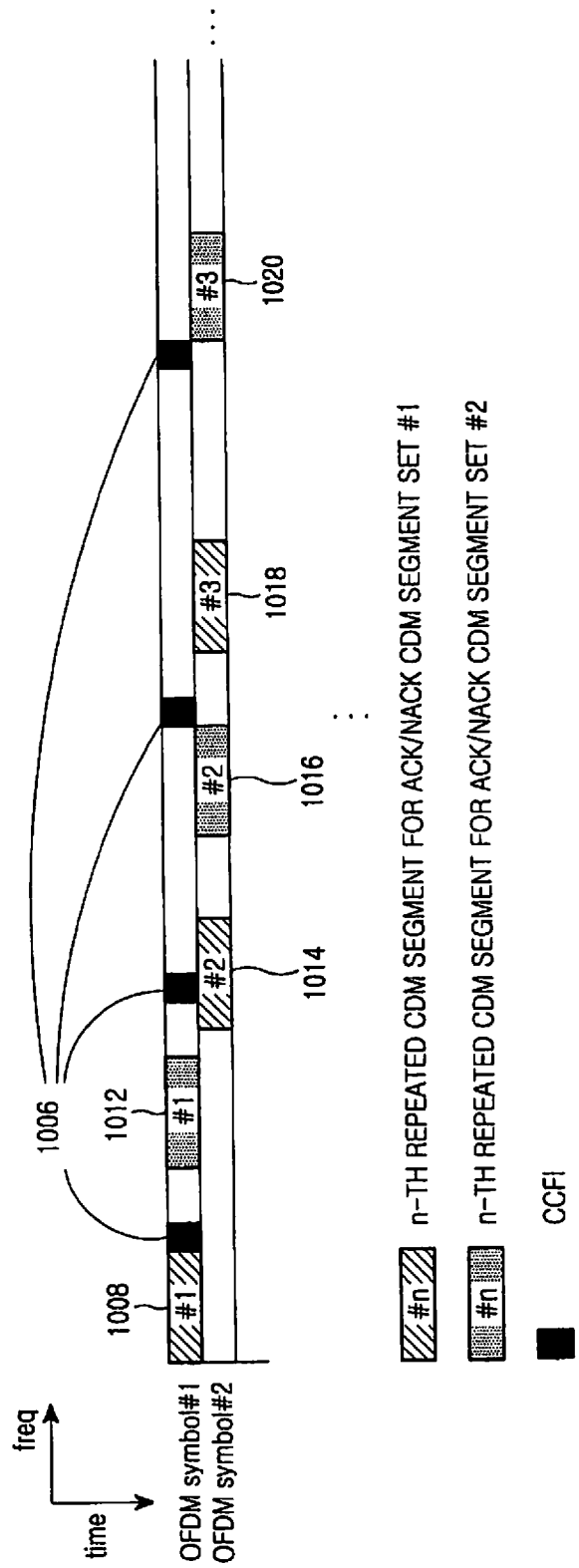
FIG. 10 is a diagram illustrating a CDM segment mapping method for ACK/NACK signal transmission according to a second embodiment of the present invention.

FIG. 10 is a diagram illustrating a CDM segment mapping method for ACK/NACK signal transmission according to the second embodiment of the present invention. As described above for FIG. 5, only CCFIs and ACK/NACK signals are illustrated in FIG. 10, for convenience. Other UL/DL scheduling information and pilot signals are not shown.

Referring to FIG. 10, reference numeral 1006 represents where the CCFI is mapped to the first OFDM symbol, and repeatedly transmitted in the frequency domain in order to obtain additional diversity gain. When CDM segments are repeated 3 times, and mapped to first 2 OFDM symbols in one subframe, the proposed method maps CDM segments for ACK/NACK transmission as will be described below. That is, the method once maps a CDM segment to which an ACK/NACK signal, intended to be transmitted to a particular UE, is mapped after being spread, to the first OFDM symbol for ACK/NACK signal transmission (1008), and twice maps the CDM segment to the second OFDM symbol for ACK/NACK signal transmission (1014 and 1018). The ACK/NACK CDM segments mapped to each OFDM symbol are created such that they do not overlap each other in the frequency domain, thereby maximally obtaining a frequency diversity effect.

In the present embodiment, a set of the 3-times repeated CDM segments is called a "CDM segment set". In the above example, because one CDM segment set can distinguish a maximum of 4 ACK/NACK signals by length-4 orthogonal codes, a plurality of CDM segment sets are defined and managed in order to multiplex a plurality of ACK/NACK signals. In this case, the multiple CDM segment sets are defined such that they do not overlap each other in the frequency domain. In the example illustrated in FIG. 10, a CDM segment set including reference numerals 1012, 1016, and 1020 is additionally defined and managed.

As the CDM segment sets are uniformly distributed to each of the resource sets for ACK/NACK transmission, information indicating which ACK/NACK CDM segment set the UE should monitor in order to receive the ACK/NACK signal from a Node B is implicitly notified by a mapping relation with scheduling control information without separate signaling, or notified by separate physical layer or upper layer signaling.

A detailed transmission/reception apparatus of the second embodiment is equal to that of the first embodiment, so a description thereof will be omitted. However, the detailed parameters follow the assumptions made in the second embodiment.

Third Embodiment

A third embodiment of the present invention, an example where the present invention is applied to MBMS Single Frequency Network (MBSFN) service supporting broadcast service such as Mobile-TV, generates one subframe with 12 OFDM symbols and transmits an ACK/NACK signal during first 2 OFDM symbols in one subframe.

The third embodiment, like the second embodiment, considers the situation where an ACK/NACK signal is spread with a spreading factor 4 and mapped to CDM segments, the CDM segment is repeated 3 times, and the ACK/NACK signal is transmitted during first 2 OFDM symbols in a subframe. Particularly, as MBSFN fixes a transmission interval of control information including an ACK/NACK signal to first 2 OFDM symbols in one subframe, there is no need for separate CCFI for indicating the control information transmission interval. The third embodiment of the present invention, described below, can be usefully applied to MBSFN where CCFI is not needed.

Figure 11:
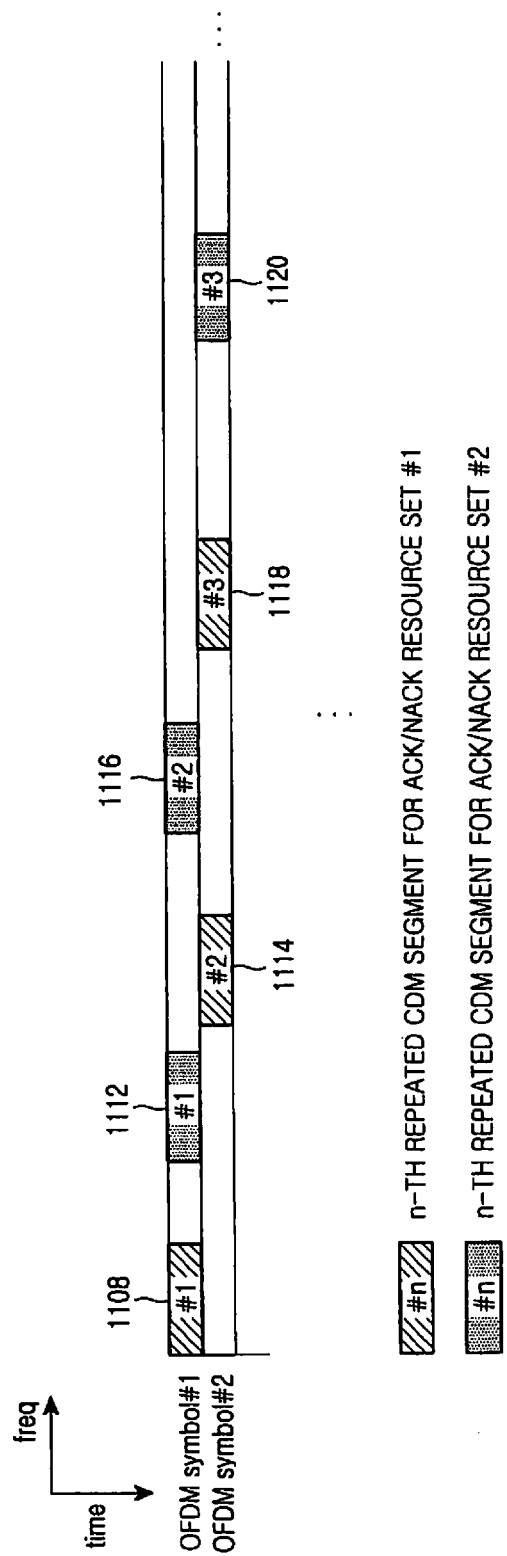
FIG. 11 is a diagram illustrating a CDM segment mapping method for ACK/NACK signal transmission according to a third embodiment of the present invention.

FIG. 11 is a diagram illustrating a CDM segment mapping method for ACK/NACK signal transmission according to the third embodiment of the present invention. For convenience, only ACK/NACK signals are shown, and other UL/DL scheduling information and pilot signals are not shown.

Referring to FIG. 11, when a CDM segment is repeated 3 times and mapped to first 2 OFDM symbols in one subframe, the method maps and operates a CDM segment for ACK/NACK transmission as will be described below. The method divides resources for ACK/NACK transmission into two types: set #1 and set #2. A set of the 3-times repeated CDM segments is called a "CDM segment set", and the CDM segment set is an element included in a resource set #1 for ACK/NACK transmission or a resource set #2 for ACK/NACK transmission.

As illustrated in FIG. 11, the resource set #1 for ACK/NACK transmission represents resources for ACK/NACK transmission, provided for once mapping a CDM segment to which an ACK/NACK signal, intended to be transmitted to a particular UE, is mapped after being spread, to the first OFDM symbol for ACK/NACK signal transmission (1108), and twice mapping the CDM segment to the second OFDM symbol for ACK/NACK signal transmission (1114 and 1118).

The resource set #2 for ACK/NACK transmission represents resources for ACK/NACK transmission, provided for twice mapping a CDM segment to which an ACK/NACK signal, intended to be transmitted to another UE, is mapped after being spread, to the first OFDM symbol for ACK/NACK signal transmission (1112 and 1116), and once mapping the CDM segment to the second OFDM symbol for ACK/NACK signal transmission (1120).

The ACK/NACK CDM segments mapped to each OFDM symbol in each set are made such that they do not overlap each other in the frequency domain, thereby maximally obtaining a frequency diversity effect. Different frequencies can be used for ACK/NACK signal multiplexing between the resource set #1 for ACK/NACK transmission and the resource set #2 for ACK/NACK transmission.

In the third embodiment, because one CDM segment set can distinguish a maximum of 4 ACK/NACK signals by orthogonal codes, a plurality of CDM segment sets are defined and managed in order to multiplex a plurality of ACK/NACK signals. In this case, the plurality of CDM segment sets are defined such that they are uniformly distributed and included in each of the resource sets for ACK/NACK transmission.

If a physical channel for transmitting ACK/NACK for an arbitrary UE(i) is defined as a Physical HARQ Indicator channel PHICH(i), the following mapping method can determine which resource set for ACK/NACK transmission the PHICH(i) uses.

Method 1

For i=odd number; PHICH(i)→resource set #1 for ACK/NACK transmission

For i=even number; PHICH(i)→resource set #2 for ACK/NACK transmission

Method 2

For floor(i/SF)=odd number; PHICH(i)→resource set #1 for ACK/NACK transmission

For floor(i/SF)=even number; PHICH(i)→resource set #2 for ACK/NACK transmission

More specifically, in Method 1, if an index i for a UE is an odd number, PHICH(i) transmits ACK/NACK using the resource set #1 for ACK/NACK transmission, and if an index i for a UE is an even number, PHICH(i) transmits ACK/NACK using the resource set #2 for ACK/NACK transmission. Of course, the opposite mapping relation can also be defined.

In Method 2, if floor(i/SF) is an odd number, PHICH(i) transmits ACK/NACK using the resource set #1 for ACK/NACK transmission, and if floor(i/SF) is an even number, PHICH(i) transmits ACK/NACK using the resource set #2 for ACK/NACK transmission. Of course, the opposite mapping relation can also be defined. In Method 2, SF indicates a spreading factor used for ACK/NACK transmission, and floor(a) is the maximum integer not greater than a.

Generally, a maximum of SF ACK/NACK signals can be multiplexed for one CDM segment, and if transmission signals for ACK/NACK are mapped to a two-dimensional region of I-channel and Q-channel, the multiplexing capacity increases double. In this case, therefore, equation of Method 2 is modified as floor(i/(SF*2)).

When a Node B intends to transmit ACK/NACK signals greater in number, both the two methods prevent overload of power or wireless resources from occurring in a particular OFDM symbol among the OFDM symbols for ACK/NACK signal transmission.

Information indicating which resource set and CDM segment set for ACK/NACK transmission the UE should monitor in order to receive the ACK/NACK signal from a Node B is implicitly notified by a mapping relation with scheduling control information without separate signaling, or notified by separate physical layer or upper layer signaling.

Defining the above operation makes it possible that power between OFDM symbols, to which ACK/NACK signals are mapped, is uniformly dispersed if possible, thereby preventing the situation where a particular OFDM symbol is power-overloaded. In addition, the definition makes it possible that wireless resources for ACK/NACK transmission are uniformly dispersed over OFDM symbols, to which ACK/NACK signals are mapped, if possible, thereby preventing the situation where wireless resources of a particular OFDM symbol are overloaded.

As described above, the CDM segments for ACK/NACK signals of each set are mapped such that they do not overlap in the frequency domain during an OFDM symbol interval. That is, CDM segments for ACK/NACK signals, classified into at least 2 sets, are repeatedly transmitted a predetermined number of times, and are allocated during 2 OFDM symbols such that the total number of repeated CDM segments for ACK/NACK signals of each set has the same ratio.

According to an example of the present invention, if the number of OFDM symbols is 2 or a multiple of 2, and a repetition of CDM segments in ACK/NACK signal group of each set is 3, ACK/NACK signals for UEs associated with the set #1 are distributed and mapped in different frequency domains in a ratio of 2:1 between the first OFDM symbol and the second OFDM symbol. Further, ACK/NACK signals for UEs associated with the set #2 are mapped such that they are distributed in the frequency domains in a ratio of 1:2 between the first OFDM symbol and the second OFDM symbol. Of course, the opposite mapping relation can also be defined.

Therefore, CDM segments of set #1 and set #2 are mapped such that they have the same ratio in two OFDM symbols in terms of summation of repetitions. The CDM segments for ACK/NACK signals of the same set are distributed and mapped so as to have the same frequency band interval in the same OFDM symbol if possible. Therefore, ACK/NACK CDM segments mapped to OFDM symbols are defined such that they do not overlap each other in the frequency domain, thereby providing frequency diversity gain.

Figure 12:
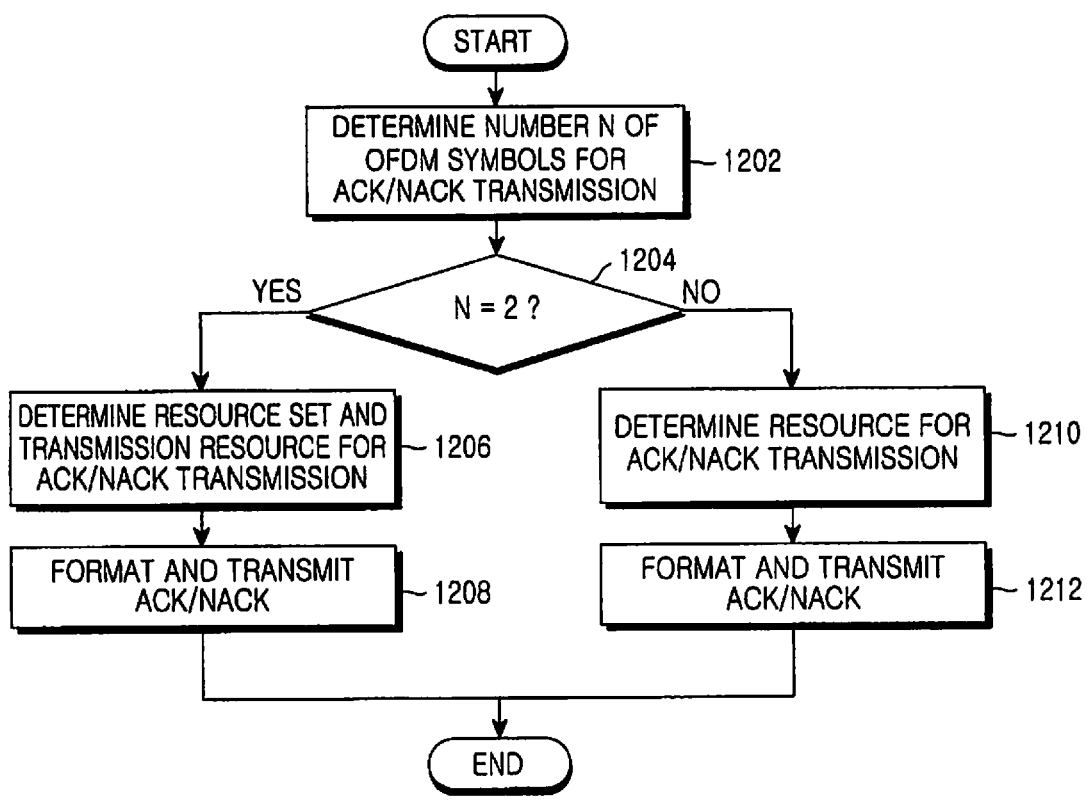
FIG. 12 is a diagram illustrating a transmission procedure for an ACK/NACK signal in a Node B according to the third embodiment of the present invention.

FIG. 12 is a diagram illustrating a transmission procedure for an ACK/NACK signal in a Node B according to the third embodiment of the present invention.

Referring to FIG. 12, in step 1202, a Node B determines the number N of OFDM symbols for ACK/NACK signal transmission of a subframe to which the currently desired transmission ACK/NACK signal belongs, in order to transmit the ACK/NACK signal. A value of N is fixed to N=2 in a subframe supporting an MBSFN service, and is determined as N=1 or N=3 in proportion to the amount of desired transmission control information in a subframe not supporting the MBSFN service.

In step 1204, the Node B determines if the number N of OFDM symbols for ACK/NACK signal transmission is equal to 2.

If it is determined in step 1204 that the number of OFDM symbols is 2, in step 1206, the Node B determines a size of a CDM segment, a predefined resource set for ACK/NACK transmission, and a CDM segment set in the resource set for ACK/NACK transmission, as resources for ACK/NACK transmission. The size of the CDM segment is a value for maintaining orthogonality between ACK/NACK signals multiplexed to CDM segments, and a fixed value is generally used. In addition, the CDM segments are made such that they do not overlap each other in the frequency domain, thereby maximally obtaining frequency diversity gain. Further, the Node B determines resources for ACK/NACK transmission such that power overload may not occur in a particular OFDM symbol among the OFDM symbols for ACK/NACK transmission. That is, the desired transmission ACK/NACK signals are uniformly distributed and mapped to the resource set #1 for ACK/NACK transmission and the resource set #2 for ACK/NACK transmission.

The determined resources for ACK/NACK transmission are implicitly notified to a UE in association with transmission resources to which scheduling information transmitted together with ACK/NACK is mapped, or notified to a UE through separate physical layer or upper layer signaling.

In step 1208, the Node B generates an ACK/NACK signal according to the presence or absence of an error in the data received from a UE, spreads the generated ACK/NACK signal, maps it to a CDM segment, and then repeatedly transmits the CDM segment 3 times in the frequency domain in order to obtain frequency-domain diversity gain. The 3-times repeated CDM segments are mapped to the ACK/NACK signal transmission resources determined in step 1206.

The resource set #1 for ACK/NACK transmission once maps a CDM segment to the first OFDM symbol, and twice maps the CDM segment to the second OFDM symbol. The resource set #2 for ACK/NACK transmission twice maps a CDM segment to the first OFDM symbol, and once maps the CDM segment to the second OFDM symbol. Therefore, the resource set #1 for ACK/NACK transmission and the resource set #2 for ACK/NACK transmission are each transmitted through 2 OFDM symbols, satisfying the repetition=3. Accordingly, the resource set #1 and set #2 for ACK/NACK transmission are transmitted through 2 OFDM symbols in the same ratio, guaranteeing diversity gain and reception performance by 3-times repeated transmission through distributed transmission on the different frequency domains and time domains. The CDM segments for a particular resource set for particular ACK/NACK transmission are distributed and mapped having the same frequency interval if possible.

If it is determined in step 1204 that the number of OFDM symbols is not 2, in step 1210, the Node B determines a size of a CDM segment and a location where the CDM segment is mapped in the frequency domain, as resources for ACK/NACK transmission. If the number of OFDM symbols for ACK/NACK transmission is 1, the Node B repeatedly maps an ACK/NACK CDM segment to the first OFDM symbol in a subframe three times.

If the number of OFDM symbols for ACK/NACK transmission is 3, the Node B once maps the ACK/NACK CDM segment to each of the first OFDM symbol, the second OFDM symbol and the third OFDM symbol in the subframe, repeating the ACK/NACK CDM segment a total of 3 times.

In step 1212, the Node B generates an ACK/NACK signal according to the presence or absence of an error in the data received from a UE, spreads the generated ACK/NACK signal, and transmits the spread signal to a receiver.

Figure 13:
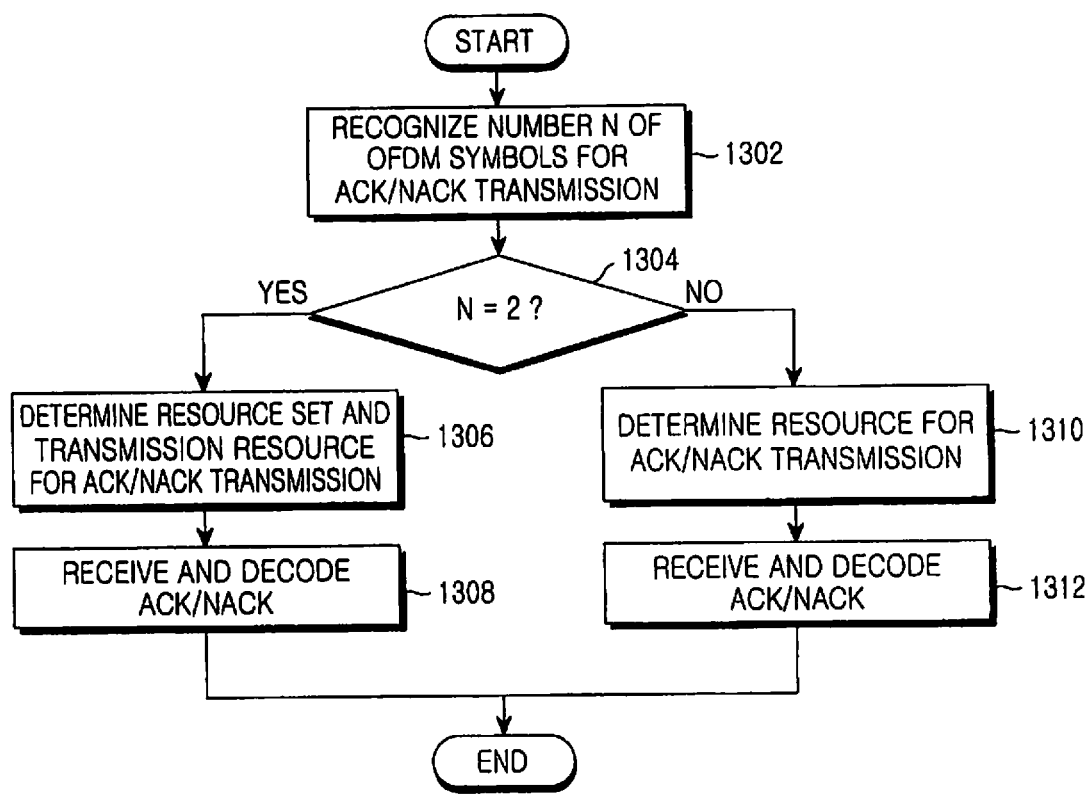
FIG. 13 is a diagram illustrating a reception procedure for an ACK/NACK signal in a UE according to the third embodiment of the present invention.

FIG. 13 is a diagram illustrating a reception procedure for an ACK/NACK signal in a UE according to the third embodiment of the present invention. The reception procedure in a UE corresponds to an inverse process of the Node B transmission procedure illustrated in FIG. 12.

Referring to FIG. 13, in step 1302, a UE recognizes the number N of OFDM symbols for control information transmission by a Node B, or its equivalent information. The information can be acquired through separate signaling transmitted from the Node B.

In step 1304, the UE determines if the recognized number N of OFDM symbols for ACK/NACK signal transmission is equal to 2.

If it is determined in step 1304 that the number of OFDM symbols for ACK/NACK signal transmission is 2, in step 1306, the UE determines with which CDM segment set the Node B has transmitted an ACK/NACK signal, among the resource sets for ACK/NACK transmission, defined for N=2. The UE can determine the CDM segment by detecting the transmission resources of the scheduling control information received together with an ACK/NACK signal, or through signaling from a physical layer and/or upper layer.

When the number of OFDM symbols is 2 and the repetition of each CDM segment for a corresponding ACK/NACK signal is 3, the UE determines that a CDM segment for a resource set #1 for ACK/NACK transmission is once mapped to the first OFDM symbol and twice mapped to the second OFDM symbol. Meanwhile, the UE determines that a resource set #2 for ACK/NACK transmission twice maps a CDM segment to the first OFDM symbol and once maps the CDM segment to the second OFDM symbol.

In step 1308, the UE extracts an ACK/NACK signal from each CDM segment to which the ACK/NACK signal is mapped, despreads it, combines the despread ACK/NACK signal with a signal despread after being extracted from each CDM segment, and performs decoding thereon.

However, if it is determined in step 1304 that a value of N is not 2, in step 1310, the UE determines with which CDM segment set the Node B has transmitted an ACK/NACK signal, among the resource sets for ACK/NACK transmission, defined for N=1 or 3. The UE can determine the CDM segment by detecting the transmission resources of the scheduling control information received together with an ACK/NACK signal, or through signaling from a physical layer and/or upper layer. In step 1312, the UE extracts an ACK/NACK signal from each CDM segment to which the ACK/NACK signal is mapped, despreads it, combines the despread ACK/NACK signal with a signal despread after being extracted from each CDM segment, and performs decoding thereon.

A detailed transmission/reception apparatus of the third embodiment is equal to that of the first embodiment, so a description thereof will be omitted. However, the detailed parameters and methods for mapping resources for ACK/NACK transmission follow the assumptions made in the third embodiment.

Fourth Embodiment

A fourth embodiment of the present invention is applied to MBSFN service supporting broadcast service such as Mobile-TV. The fourth embodiment considers the situation in which an ACK/NACK signal is spread with a spreading factor 4 and mapped to a CDM segment, the CDM segment is repeated 3 times, and the ACK/NACK signal is transmitted during first 2 OFDM symbols in a subframe by applying a Space-Frequency Block Coding (SFBC) method, which is a diversity transmission method based on 4 transmit antennas. SFBC, a combination of complex conjugation and sign reversal for a desired transmission signal, is a technology for obtaining diversity gain by reconfiguring a signal so that it has orthogonality over a spatial domain and a frequency domain.

Figure 14:
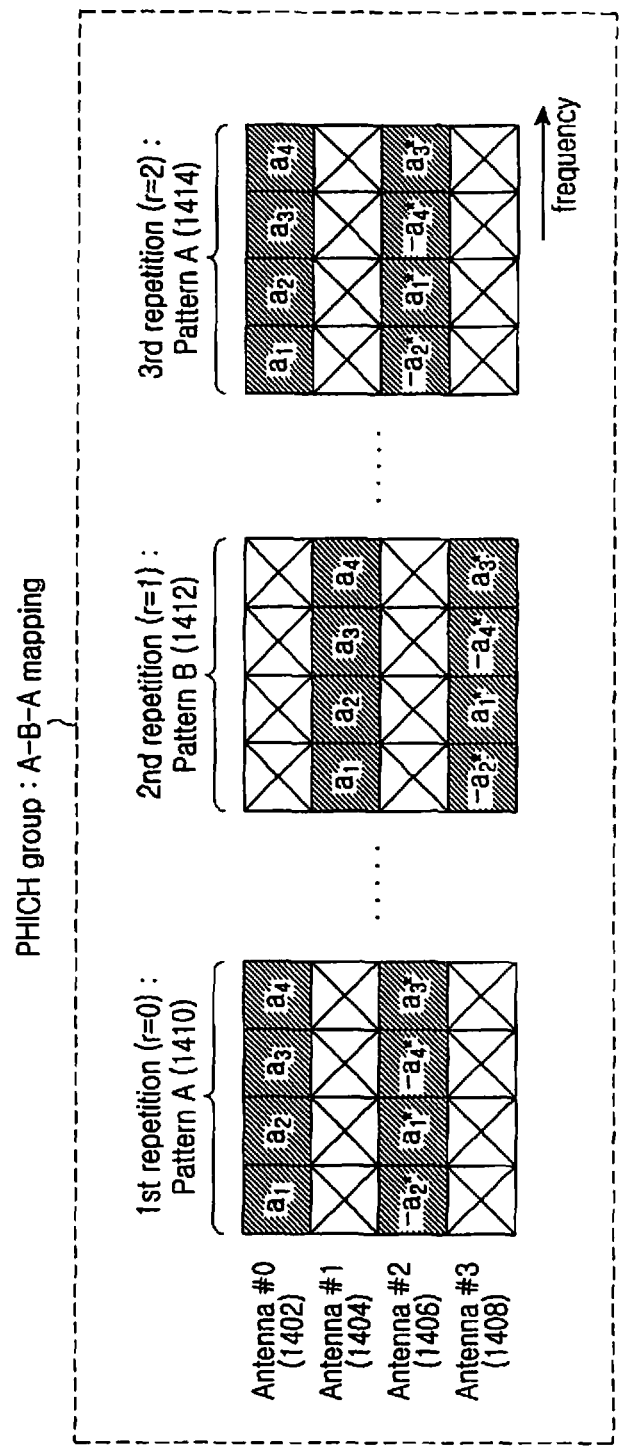
FIG. 14 is a diagram illustrating an A-B-A antenna mapping pattern in an SFBC scheme in which SF=4 and 4 transmit antennas are used, according to a fourth embodiment of the present invention.
Figure 15:
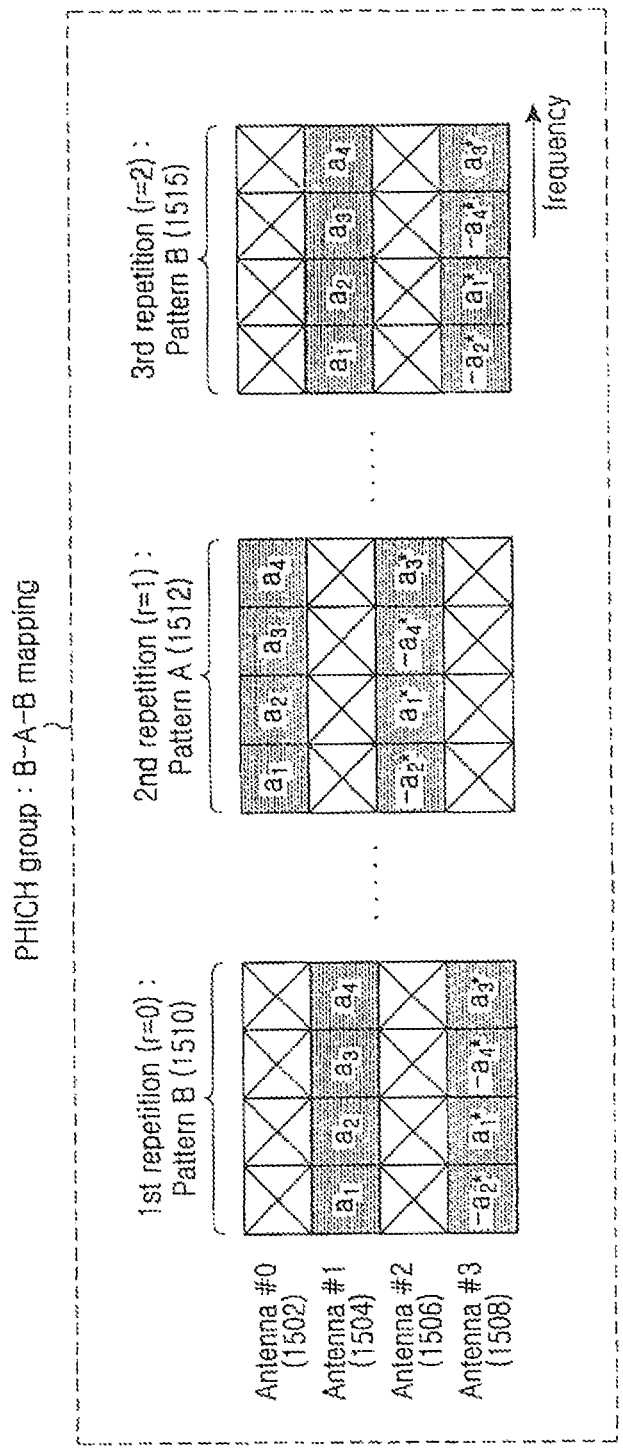
FIG. 15 is a diagram illustrating an B-A-B antenna mapping pattern in an SFBC scheme in which SF=4 and 4 transmit antennas are used, according to the fourth embodiment of the present invention.

With reference to FIGS. 14 and 15, a description will now be made of the detailed operating principle of mapping an ACK/NACK signal to a plurality of transmit antennas by applying an SFBC method according to the present invention performed on the above conditions. For convenience, only ACK/NACK signals are illustrated, and other UL/IDL scheduling information and pilot signals are not illustrated.

An ACK/NACK signal for an arbitrary UE(i) is generated as a modulation symbol through Binary Phase Shift Keying (BPSK) or Quadrature Phase Shift Keying (QPSK) modulation, and the generated ACK/NACK modulation symbol is spread with a length-4 orthogonal code and mapped to a CDM segment. The CDM segment is a resource unit including consecutive REs in the time-frequency domain, the number of which corresponds to a spreading factor of an orthogonal code for ACK/NACK transmission, and the REs are excluded, to which other control signals except for pilot signals (or RSs) for channel estimation and ACK/NACK are mapped. A physical channel for transmitting an ACK/NACK signal for the UE(i) is defined as PHICH(i). PHICHs can be multiplexed to the same CDM segment. The number of PHICHs corresponds to a spreading factor of an orthogonal code applied for spreading an ACK/NACK signal, and a set of PHICHs multiplexed to the same CDM segment is defined as a PHICH group.

If I/Q multiplexing of different PHICHs to a real component and an imaginary component is applied, a maximum of SF*2 PHICHs can be multiplexed to the same CDM segment. PHICHs belonging to the same PHICH group are multiplexed to the same CDM segment, and repeatedly transmitted in the frequency domain three times. That is, a size of a CDM segment for transmitting one PHICH is 4 (SF=4), and the PHICH is mapped to 3 different CDM segments in the frequency domain. For convenience, each CDM segment is independently expressed with a repetition index r (r=0, 1, . . . , R−1; R=3).

That is, among the CDM segments repeated 3 times in the frequency domain, the first CDM segment is identified by a repetition index r=0, the second CDM segment is identified by a repetition index r=1, and the third CDM segment is identified by a repetition index r=2. Additionally, if a PHICH group index g (g=0, 1, . . . G−1) for identifying a PHICH group to which PHICH(i) for an arbitrary UE(i) belongs is defined, it can be calculated as shown in Equation (1).

$$g=\text{floor}(i/\text{PHICH\_GROUP\_SIZE}) \quad (1)$$

In Equation (1), PHICH_GROUP_SIZE is a value indicating how many PHICHs are CDM-multiplexed to one PHICH group, and it is SF*2 if I/Q multiplexing is applied. Otherwise, it is SF.

In the present invention, if an ACK/NACK modulation symbol is spread with an SF=4 orthogonal code, a signal including four chips a1, a2, a3, and a4 is generated. A pattern for sequentially mapping the generated chips to a CDM segment of an antenna #0 (1402 of FIG. 14 or 1502 of FIG. 15) among 4 transmit antennas in the frequency domain, and sequentially mapping −a2\*, a1\*, −a4\*, and a3\*, which are expressed with complex conjugates or sign-reversed signals of the generated chips, to a CDM segment of an antenna #2 (1406 or 1506) in the frequency domain, is called a pattern A, where a\* is a complex conjugate of a.

A pattern for sequentially mapping a1, a2, a3, and a4 generated by spreading an ACK/NACK signal with an SF=4 orthogonal code to a CDM segment of an antenna #1 (1404 or 1504) among 4 transmit antennas in the frequency domain, and sequentially mapping −a2\*, a1\*, −a4\*, and a3\*, which are expressed with complex conjugates or sign-reversed signals of the generated chips, to a CDM segment of an antenna #3 (1408 or 1508) in the frequency domain, is called a pattern B.

In applying SFBC based on 4 transmit antennas to PHICH for transmitting an ACK/NACK signal spread with the SF=4 orthogonal code, antenna mapping is performed with one of the following two methods according to a PHICH group index g and a repetition index r.

FIG. 14 illustrates an example of transmitting PHICH according to a repetition index r of a CDM segment, i.e., transmitting PHICH with a pattern A 1410 for r=0, with a pattern B 1412 for r=1, and with a pattern A 1414 for r=2. Herein, this process will be referred to as "A-B-A antenna mapping".

FIG. 15 illustrates an example of transmitting PHICH according to a repetition index r of a CDM segment, i.e., transmitting PHICH with a pattern B 1510 for r=0, a pattern A 1512 for r=1, and a pattern B 1514 for r=2. Herein, this process will be referred to as "B-A-B antenna mapping".

By performing A-B-A mapping according to a PHICH group index g, i.e., for g=even number, and performing B-A-B mapping for g=odd number (or its inverse operation is also possible), transmit power between antennas is uniformly distributed when a plurality of PHICHs are transmitted, thereby preventing the situation where a particular antenna is power-overloaded.

Figure 16:
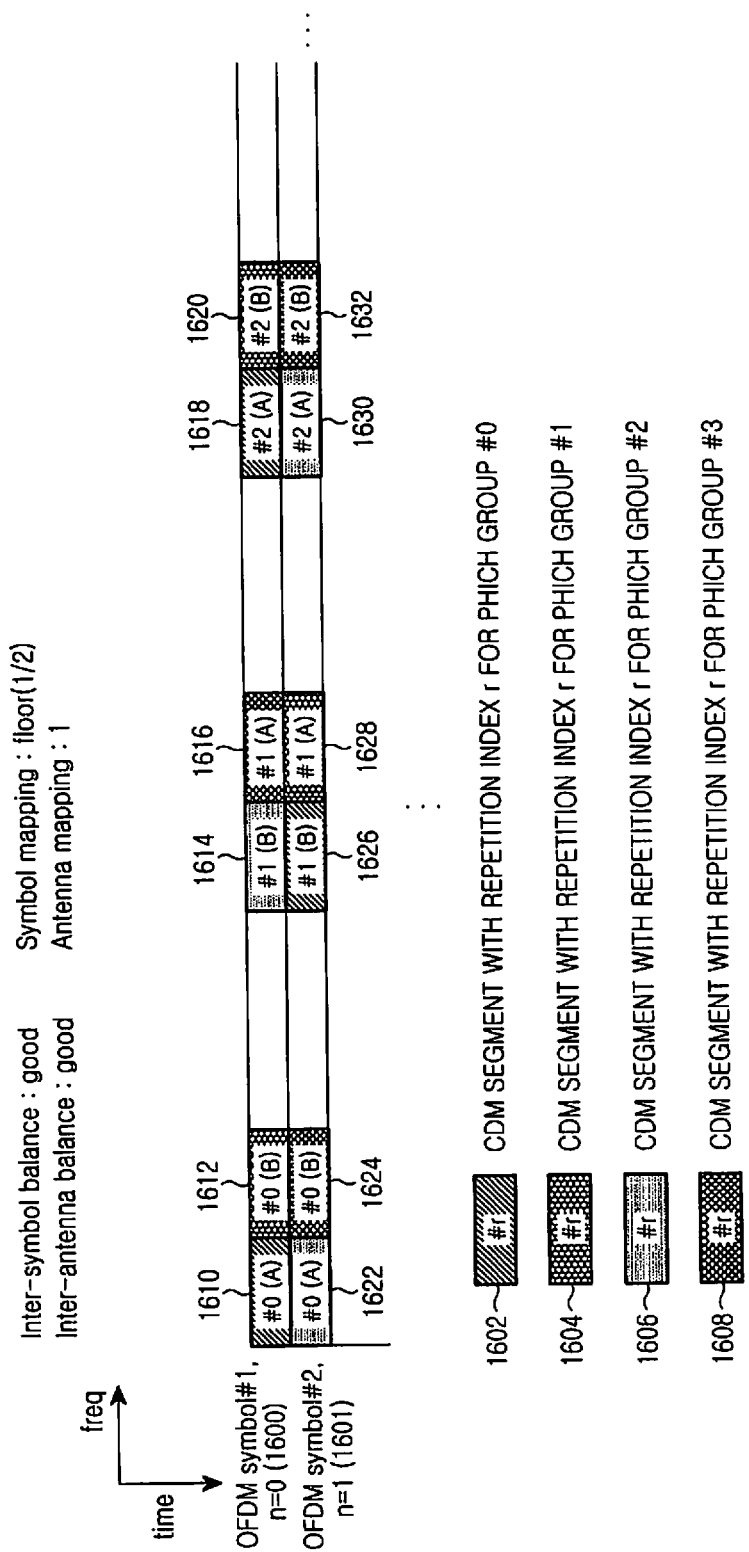
FIG. 16 is a diagram illustrating a method for mapping a PHICH group in a time-frequency domain in an SFBC scheme in which SF=4 and 4 transmit antennas are used, according to the fourth embodiment of the present invention.

FIG. 16 illustrates a method for mapping a PHICH group in a time-frequency domain depending on an antenna mapping method according to a preferred embodiment of the present invention.

Referring to FIG. 16, the horizontal axis represents the frequency domain, and the vertical axis represents the time domain. CDM segments included in one PHICH group are mapped to different zones in the frequency domain, and mapped within an OFDM symbol #1 and an OFDM symbol #2 in the time domain in a distributed manner. An index for identifying an OFDM symbol is denoted by n, where n=0, 1.

The first CDM segment (r=0) of a PHICH group g=0 (1602) is mapped to the OFDM symbol #1 (n=0) by applying the antenna mapping pattern A (1610), the second CDM segment (r=1) is mapped to the OFDM symbol #2 (n=1) by applying the antenna mapping pattern B (1626), and the third CDM segment (r=2) is mapped to the OFDM symbol #1 (n=0) by applying the antenna mapping pattern A (1618). The first CDM segment (r=0) of a PHICH group g=1 (1604) is mapped to the OFDM symbol #1 (n=0) by applying the antenna mapping pattern B (1612), the second CDM segment (r=1) is mapped to the OFDM symbol #2 (n=1) by applying the antenna mapping pattern A (1628), and the third CDM segment (r=2) is mapped to the OFDM symbol #1 (n=0) by applying the antenna mapping pattern B (1620).

That is, for PHICH group g=0 and PHICH group g=1, their methods for mapping each CDM segment to an OFDM symbol in the time domain are maintained equally, and their antenna mapping patterns are maintained differently as A-B-A mapping and B-A-B mapping, respectively. Therefore, when 2 PHICH groups are mapped and transmitted, transmit power between antennas is maximally uniformly distributed at an arbitrary time, thereby preventing the situation where a particular antenna is power-overloaded.

Additionally, when a PHICH group is transmitted, the first CDM segment (r=0) of a PHICH group g=2 (1606) is mapped to the OFDM symbol #2 (n=1) by applying the antenna mapping pattern A (1622), the second CDM segment (r=1) is mapped to the OFDM symbol #1 (n=0) by applying antenna mapping pattern B (1614), and the third CDM segment (r=2) is mapped to the OFDM symbol #2 (n=1) by applying the antenna mapping pattern A (1630). The first CDM segment (r=0) of a PHICH group g=3 (1608) is mapped to the OFDM symbol #2 (n=1) by applying the antenna mapping pattern B (1624), the second CDM segment (r=1) is mapped to the OFDM symbol #1 (n=0) by applying the antenna mapping pattern A (1616), and the third CDM segment (r=2) is mapped to the OFDM symbol #2 (n=1) by applying the antenna mapping pattern B (1632).

That is, for PHICH group g=2 and PHICH group g=3, their methods for mapping each CDM segment to an OFDM symbol in the time domain are maintained equally, and their antenna mapping patterns are maintained differently as A-B-A mapping and B-A-B mapping, respectively. Therefore, when a total of 4 PHICH groups are mapped and transmitted, transmit power between antennas is maximally uniformly distributed at an arbitrary time and at the same time, transmit power between OFDM symbols is also maximally uniformly distributed, thereby preventing the situation where particular antenna and OFDM symbol are power-overloaded.

The complexity of a mapping operation can be reduced by matching a frequency-domain location of each CDM segment in PHICH group g=2 and PHICH group g=3 to the predetermined frequency-domain location of each CDM segment of PHICH group g=0 and PHICH group g=1.

If there is a need to map and transmit more than a total of 4 PHICH groups, the added PHICH group(s) applies the mapping operation defined for PHICH groups g=0-3 so that the PHICH groups do not overlap each other in the time-frequency domain.

The mapping operations described in conjunction with FIGS. 14 and 15 can be summarized as shown in Table 1.

TABLE 1

| PHICH group g | CDM segment repetition index r | OFDM symbol index n | Antenna mapping pattern |
|---|---|---|---|
| 0 | 0 | 0 | A |
| 0 | 1 | 1 | B |
| 0 | 2 | 0 | A |
| 1 | 0 | 0 | B |
| 1 | 1 | 1 | A |
| 1 | 2 | 0 | B |
| 2 | 0 | 1 | A |
| 2 | 1 | 0 | B |
| 2 | 2 | 1 | A |
| 3 | 0 | 1 | B |
| 3 | 1 | 0 | A |
| 3 | 2 | 1 | B |
| . . . | . . . | . . . | . . . |

In Table 1, when the first CDM segment r=0 of a PHICH group g=0 is mapped to an OFDM symbol n=0 (when a start symbol of an OFDM symbol is defined as n=0), an OFDM symbol index n is mapped in order of [010, 010, 101, 101, . . . ]. When the first CDM segment r=0 of the PHICH group g=0 is mapped beginning at an OFDM symbol n=1 (when a start symbol of an OFDM symbol is defined as n=1), an OFDM symbol index n is mapped in reversed order of [101, 101, 010, 010 . . . ].

As described above, information indicating which CDM segments the UE should monitor in order to receive the ACK/NACK signal from a Node B is implicitly notified by a mapping relation with scheduling control information or resources for UL data transmission without separate signaling, or notified by separate physical layer or upper layer signaling.

A detailed transmission/reception apparatus of the fourth embodiment is to the same as that of the first embodiment, so a description thereof will be omitted. However, the detailed parameters and methods for mapping resources for ACK/NACK transmission follow the assumptions made in the fourth embodiment.

Fifth Embodiment

A fifth embodiment of the present invention is applied to MBSFN service supporting broadcast service such as Mobile-TV. The fifth embodiment considers a situation in which an ACK/NACK signal is spread with a spreading factor 2 and mapped to a length-2 mini CDM segment, the mini CDM segment is repeated 3 times, and the ACK/NACK signal is transmitted during first 2 OFDM symbols in a subframe by applying an SFBC method, which is a diversity transmission method based on 4 transmit antennas.

Figure 17:
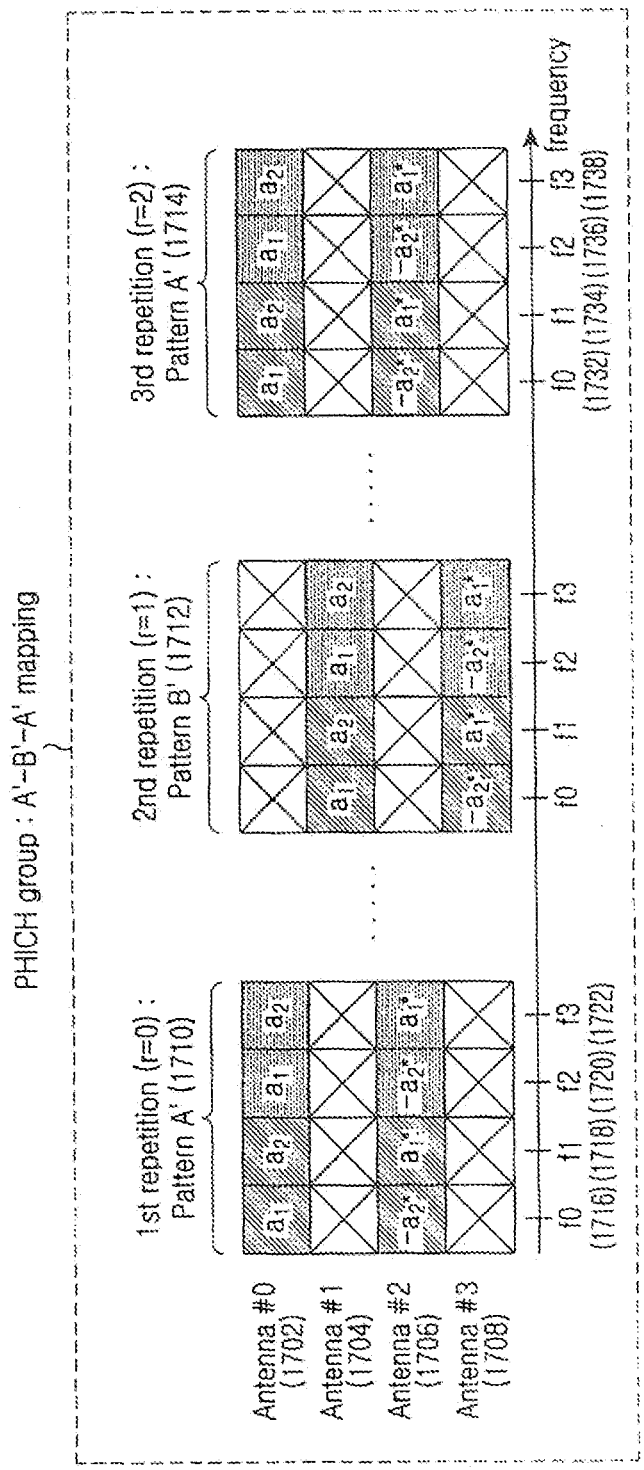
FIG. 17 is a diagram illustrating an A'-B'-A' antenna mapping pattern in an SFBC scheme in which SF=2 and 4 transmit antennas are used, according to a fifth embodiment of the present invention.
Figure 18:
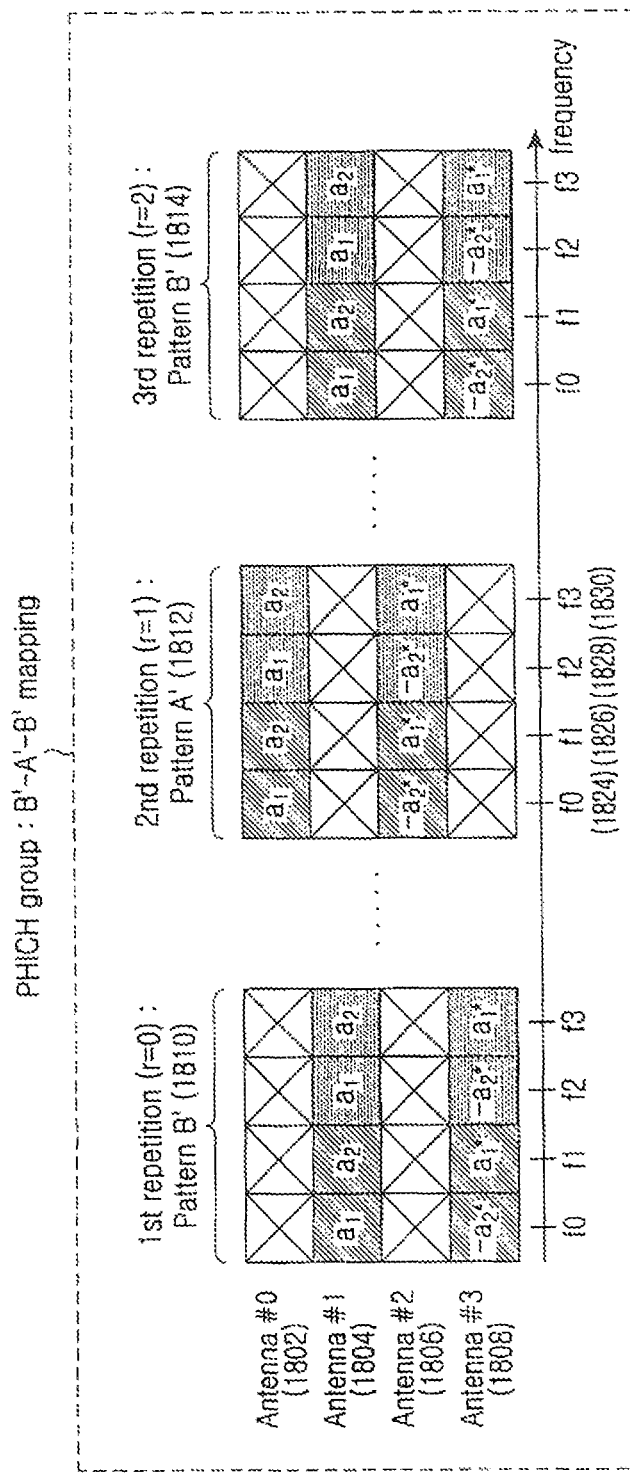
FIG. 18 is a diagram illustrating an B'-A'-B' antenna mapping pattern in an SFBC scheme in which SF=2 and 4 transmit antennas are used, according to a fifth embodiment of the present invention.

With reference to FIGS. 17 and 18, a description will now be made of the detailed operating principle of mapping an ACK/NACK signal to a plurality of transmit antennas by applying an SFBC method according to the present invention performed on the above conditions. For convenience, only ACK/NACK signals are shown, and other UL/DL scheduling information and pilot signals are not shown.

An ACK/NACK signal for an arbitrary UE(i) is generated as a modulation symbol through BPSK or QPSK modulation, and the generated ACK/NACK modulation symbol is spread with a length-2 orthogonal code and mapped to a mini CDM segment. The mini CDM segment is a resource unit including consecutive REs in the time-frequency domain, the number of which corresponds to a spreading factor of an orthogonal code for ACK/NACK transmission, and the REs are excluded, to which other control signals except for pilot signals (or RSs) for channel estimation and ACK/NACK are mapped. The 2 mini CDM segments are included in the CDM segment described in the fourth embodiment. A set of PHICHs multiplexed to the same mini CDM segment is referred to as a "PHICH group".

PHICHs belonging to the same PHICH group are multiplexed to the same mini CDM segment, and repeatedly transmitted in the frequency domain three times. That is, a size of a mini CDM segment for transmitting one PHICH is 2 (SF=2), and the PHICH is mapped to 3 different mini CDM segments in the frequency domain. For convenience, each mini CDM segment is independently expressed with a repetition index r (r=0, 1, . . . , R−1; R=3).

That is, among the mini CDM segments repeated 3 times in the frequency domain, the first mini CDM segment is identified by a repetition index r=0, the second mini CDM segment is identified by a repetition index r=1, and the third mini CDM segment is identified by a repetition index r=2. Additionally, if a PHICH group index g (g=0, 1, . . . G−1) for identifying a PHICH group to which PHICH(i) for an arbitrary UE(i) belongs is defined, it can be calculated as shown in Equation (2).

$$g = \text{floor}(i/\text{PHICH\_GROUP\_SIZE}) \quad (2)$$

In Equation (2), PHICH_GROUP_SIZE is a value indicating how many PHICHs are CDM-multiplexed to one PHICH group, and it is SF*2 if I/Q multiplexing is applied. Otherwise, it is SF.

In the fifth embodiment, if an ACK/NACK modulation symbol is spread with an SF=2 orthogonal code, a signal including two chips a1 and a2 is generated. A pattern for sequentially mapping the generated chips to a CDM segment of an antenna #0 (1702 of FIG. 17 or 1802 of FIG. 18) among 4 transmit antennas at the locations f0 (1716 and 1732 in FIG. 17, and 1824 in FIG. 18) and f1 (1718 and 1734 in FIG. 17, and 1826 in FIG. 18) in the frequency domain, and sequentially mapping −a2* and a1*, which are expressed with complex conjugates or sign-reversed signals of the generated chips, to a CDM segment of an antenna #2 (1706 or 1806) at the locations f0 (1716 and 1732 in FIG. 17, and 1824 in FIG. 18) and f1 (1718 and 1734 in FIG. 17, and 1826 in FIG. 18) in the frequency domain, and if another ACK/NACK modulation symbol is spread with an SF=2 orthogonal code, mapping the generated two chips a1 and a2 to the locations f2 (1720 and 1736 in FIG. 17, and 1828 in FIG. 18) and f3 (1722 and 1738 in FIG. 17, and 1830 in FIG. 18) in the frequency domain, and mapping −a2* and a1*, which are expressed with complex conjugates or sign-reversed signals of the generated chips, to the locations f0 and f1 and the locations f2 and f3 of the antenna #2, is referred to as "pattern A'".

A pattern for sequentially mapping a1 and a2 generated by spreading an ACK/NACK modulation symbol with an SF=2 orthogonal code to a CDM segment of an antenna #1 (1704 or 1804) among 4 transmit antennas at the locations f0 and f1 in the frequency domain, and sequentially mapping −a2* and a1*, which are expressed with complex conjugates or sign-reversed signals of the generated chips, to a CDM segment of an antenna #3 (1708 or 1808) at the locations f0 and f1 in the frequency domain, and if another ACK/NACK modulation symbol is spread with an SF=2 orthogonal code, sequentially mapping the generated a1 and a2 to a CDM segment of the antenna #1 (1704 or 1804) among 4 transmit antennas at the locations f2 and f3 in the frequency domain, and sequentially mapping −a2* and a1*, which are expressed with complex conjugates or sign-reversed signals of the generated chips, to a CDM segment of the antenna #3 (1708 or 1808) at the locations f2 and f3 in the frequency domain, is referred to as "pattern B'".

In applying SFBC based on 4 transmit antennas to PHICH for transmitting an ACK/NACK signal spread with the SF=2 orthogonal code, antenna mapping is performed using one of the following two methods according to a PHICH group index g and a repetition index r.

FIG. 17 illustrates an example of transmitting PHICH according to a repetition index r of a mini CDM segment, i.e., transmitting PHICH with a pattern A' 1710 for r=0, with a pattern B' 1712 for r=1, and with a pattern A' 1714 for r=2. Herein, this will be referred to as "A'-B'-A' antenna mapping".

FIG. 18 illustrates an example of transmitting PHICH according to a repetition index r of a mini CDM segment, i.e., transmitting PHICH with a pattern B' 1810 for r=0, with a pattern A' 1812 for r=1, and with a pattern B' 1814 for r=2. Herein, this will be referred to as "B'-A'-B' antenna mapping".

By defining an operation of performing A'-B'-A' mapping according to a PHICH group index g, i.e., for floor(g/2)=even number, and performing B'-A'-B' mapping for floor(g/2)=odd number (or its inverse operation is also possible), transmit power between antennas is uniformly distributed when a plurality of PHICHs are transmitted, thereby preventing the situation where a particular antenna is power-overloaded.

Figure 19:
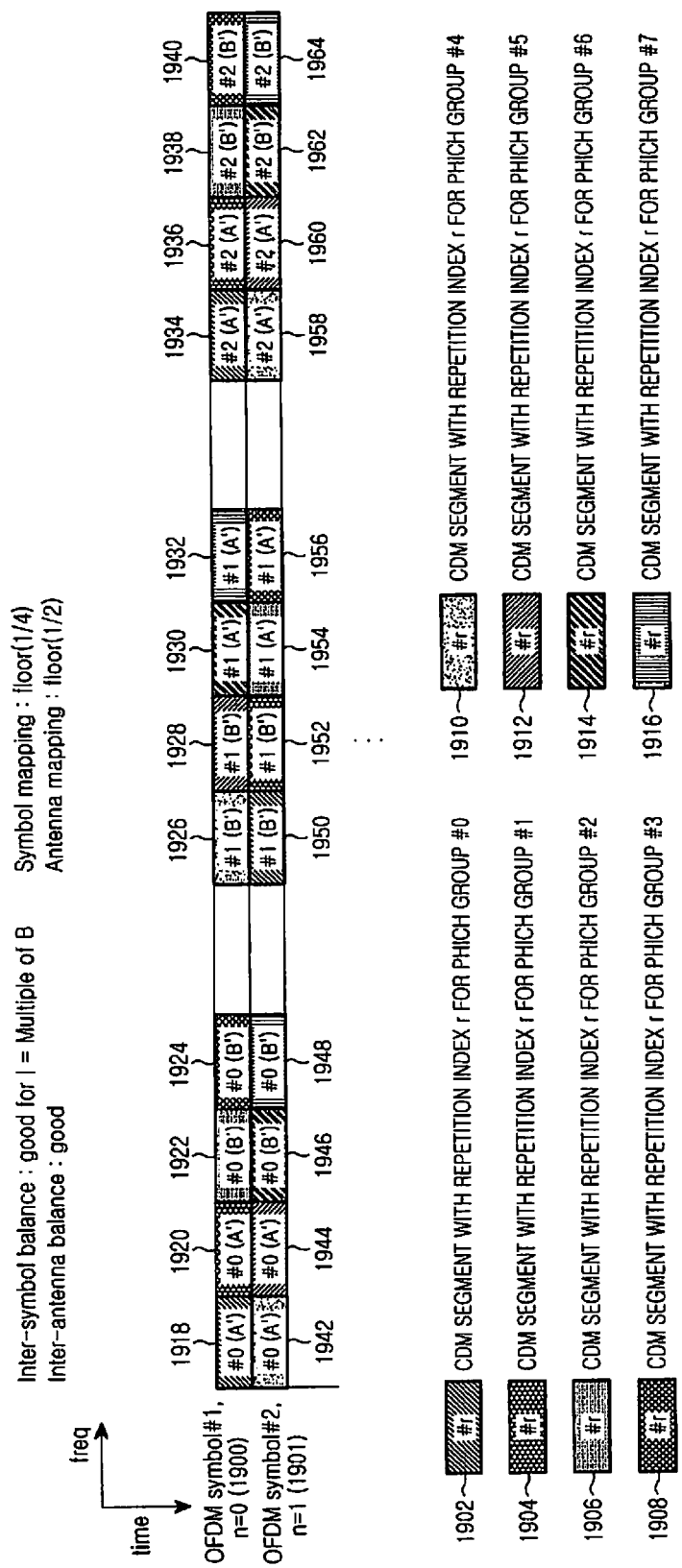
FIG. 19 is a diagram illustrating a method for mapping a PHICH group in a time-frequency domain in an SFBC scheme in which SF=2 and 4 transmit antennas are used, according to the fifth embodiment of the present invention.

FIG. 19 is a diagram illustrating a method for mapping a PHICH group in a time-frequency domain depending on an antenna mapping method according to the present invention. With reference to FIG. 19, a description will now be made of a mapping method for uniformly distributing transmit power between OFDM symbols and antennas to which a PHICH group is mapped.

Referring to FIG. 19, the horizontal axis represents the frequency domain, and the vertical axis represents the time domain. Mini CDM segments included in one PHICH group are mapped to different zones in the frequency domain, and mapped within an OFDM symbol #1 and an OFDM symbol #2 in the time domain in a distributed manner. An index for identifying an OFDM symbol is denoted by n, where n=0, 1.

The first mini CDM segment (r=0) of a PHICH group g=0 (1902) is mapped to the OFDM symbol #1 (n=0) by applying the antenna mapping pattern A'(1918), the second mini CDM segment (r=1) is mapped to the OFDM symbol #2 (n=1) by applying the antenna mapping pattern B'(1950), and the third mini CDM segment (r=2) is mapped to the OFDM symbol #1 (n=0) by applying the antenna mapping pattern A'(1934).

The first mini CDM segment (r=0) of a PHICH group g=1 (1904) is mapped to the OFDM symbol #1 (n=0) by applying the antenna mapping pattern A'(1920), the second mini CDM segment (r=1) is mapped to the OFDM symbol #2 (n=1) by applying the antenna mapping pattern B'(1952), and the third mini CDM segment (r=2) is mapped to the OFDM symbol #1 (n=0) by applying the antenna mapping pattern A'(1936).

The first mini CDM segment (r=0) of a PHICH group g=2 (1906) is mapped to the OFDM symbol #1 (n=0) by applying the antenna mapping pattern B'(1922), the second mini CDM segment (r=1) is mapped to the OFDM symbol #2 (n=1) by applying the antenna mapping pattern A'(1954), and the third mini CDM segment (r=2) is mapped to the OFDM symbol #1 (n=0) by applying the antenna mapping pattern B'(1938).

The first mini CDM segment (r=0) of a PHICH group g=3 (1908) is mapped to the OFDM symbol #1 (n=0) by applying the antenna mapping pattern B'(1924), the second mini CDM segment (r=1) is mapped to the OFDM symbol #2 (n=1) by applying the antenna mapping pattern A'(1956), and the third mini CDM segment (r=2) is mapped to the OFDM symbol #1 (n=0) by applying the antenna mapping pattern B'(1940).

That is, for PHICH groups g=0-3, their methods for mapping each mini CDM segment to an OFDM symbol in the time domain are maintained equally, and the antenna mapping pattern applies the A'-B'-A' mapping for PHICH group g=0-1 and the B'-A'-B' mapping for PHICH group g=2-3. Therefore, when 4 PHICH groups are mapped and transmitted, transmit power between antennas is maximally uniformly distributed at an arbitrary time, thereby preventing the situation where a particular antenna is power-overloaded.

Additionally, when a PHICH group is transmitted, the first mini CDM segment (r=0) of a PHICH group g=4 (1910) is mapped to the OFDM symbol #2 (n=1) by applying the antenna mapping pattern A'(1942), the second mini CDM segment (r=1) is mapped to the OFDM symbol #1 (n=0) by applying the antenna mapping pattern B' (1926), and the third mini CDM segment (r=2) is mapped to the OFDM symbol #2 (n=1) by applying antenna mapping pattern A'(1958).

The first mini CDM segment (r=0) of a PHICH group g=5 (1912) is mapped to the OFDM symbol #2 (n=1) by applying the antenna mapping pattern A'(1944), the second mini CDM segment (r=1) is mapped to the OFDM symbol #1 (n=0) by applying the antenna mapping pattern B'(1928), and the third mini CDM segment (r=2) is mapped to the OFDM symbol #2 (n=1) by applying the antenna mapping pattern A'(1960).

The first mini CDM segment (r=0) of a PHICH group g=6 (1914) is mapped to the OFDM symbol #2 (n=1) by applying the antenna mapping pattern B'(1946), the second mini CDM segment (r=1) is mapped to the OFDM symbol #1 (n=0) by applying the antenna mapping pattern A'(1930), and the third mini CDM segment (r=2) is mapped to the OFDM symbol #2 (n=1) by applying the antenna mapping pattern B'(1962).

The first mini CDM segment (r=0) of a PHICH group g=7 (1916) is mapped to the OFDM symbol #2 (n=1) by applying the antenna mapping pattern B'(1948), the second mini CDM segment (r=1) is mapped to the OFDM symbol #1 (n=0) by applying the antenna mapping pattern A'(1932), and the third mini CDM segment (r=2) is mapped to the OFDM symbol #2 (n=1) by applying the antenna mapping pattern B'(1964).

That is, for PHICH groups g=4-7, their methods for mapping each mini CDM segment to an OFDM symbol in the time domain are maintained equally, and the antenna mapping pattern applies the A'-B'-A' mapping for PHICH group g=4-5 and the B'-A'-B' mapping for PHICH group g=6-7. Therefore, when a total of 8 PHICH groups are mapped and transmitted, transmit power between antennas is maximally uniformly distributed at an arbitrary time and at the same time, transmit power between OFDM symbols is also maximally uniformly distributed, thereby preventing the situation where a particular antenna and OFDM symbol are power-overloaded.

The complexity of a mapping operation can be reduced by matching a frequency-domain location of each CDM segment in PHICH group g=4-7 to the predetermined frequency-domain location of each CDM segment of PHICH group g=0-3.

If there is a need to map and transmit more than a total of 8 PHICH groups, the added PHICH group(s) applies the mapping operation defined for PHICH groups g=0-7 so that the PHICH groups do not overlap each other in the time-frequency domain.

The mapping operation described in conjunction with FIGS. 17 and 18 can be summarized as shown in Table 2.

TABLE 2

| PHICH group g | Mini CDM segment repetition index r | OFDM symbol index n | Antenna mapping pattern |
|---|---|---|---|
| 0 | 0 | 0 | A' |
| 0 | 1 | 1 | B' |
| 0 | 2 | 0 | A' |
| 1 | 0 | 0 | A' |
| 1 | 1 | 1 | B' |
| 1 | 2 | 0 | A' |
| 2 | 0 | 0 | B' |
| 2 | 1 | 1 | A' |
| 2 | 2 | 0 | B' |
| 3 | 0 | 0 | B' |
| 3 | 1 | 1 | A' |
| 3 | 2 | 0 | B' |
| 4 | 0 | 1 | A' |
| 4 | 1 | 0 | B' |
| 4 | 2 | 1 | A' |
| 5 | 0 | 1 | A' |
| 5 | 1 | 0 | B' |
| 5 | 2 | 1 | A' |
| 6 | 0 | 1 | B' |
| 6 | 1 | 0 | A' |
| 6 | 2 | 1 | B' |
| 7 | 0 | 1 | B' |
| 7 | 1 | 0 | A' |
| 7 | 2 | 1 | B' |
| ... | ... | ... | ... |

In Table 2, when the first CDM segment r=0 of a PHICH group g=0 is mapped to an OFDM symbol n=0 (when a start symbol of an OFDM symbol is defined as n=0), an OFDM symbol index n is mapped in order of [010, 010, 010, 010, 101, 101, 101, 101, . . . ]. When the first CDM segment r=0 of the PHICH group g=0 is mapped beginning at an OFDM symbol n=1 (when a start symbol of an OFDM symbol is defined as n=1), an OFDM symbol index n is mapped in reversed order of [101, 101, 101, 101, 010, 010, 010, 010 . . . ].

Information indicating which CDM segments the UE should monitor in order to receive the ACK/NACK signal from a Node B is implicitly notified by a mapping relation with scheduling control information or resources for UL data transmission without separate signaling, or notified by separate physical layer or upper layer signaling.

A detailed transmission/reception apparatus of the fifth embodiment is equal to that of the first embodiment, so a description thereof will be omitted. However, the detailed parameters and methods for mapping resources for ACK/NACK transmission follow the assumptions made in the fifth embodiment.

Sixth Embodiment

A sixth embodiment of the present invention is applied to MBSFN service supporting broadcast service such as Mobile-TV. The sixth embodiment considers a situation in which an ACK/NACK signal is spread with a spreading factor 4 and mapped to a CDM segment, the CDM segment is repeated 3 times, and the ACK/NACK signal is transmitted during first 2 OFDM symbols in a subframe by applying an SFBC method which is a diversity transmission method based on 4 transmit antennas.

The sixth embodiment, another modification of the fourth embodiment, to which the antenna mapping patterns A and B defined in the fourth embodiment are applied, maps PHICH groups in the time-frequency domain as illustrated in FIG. 18.

Figure 20:
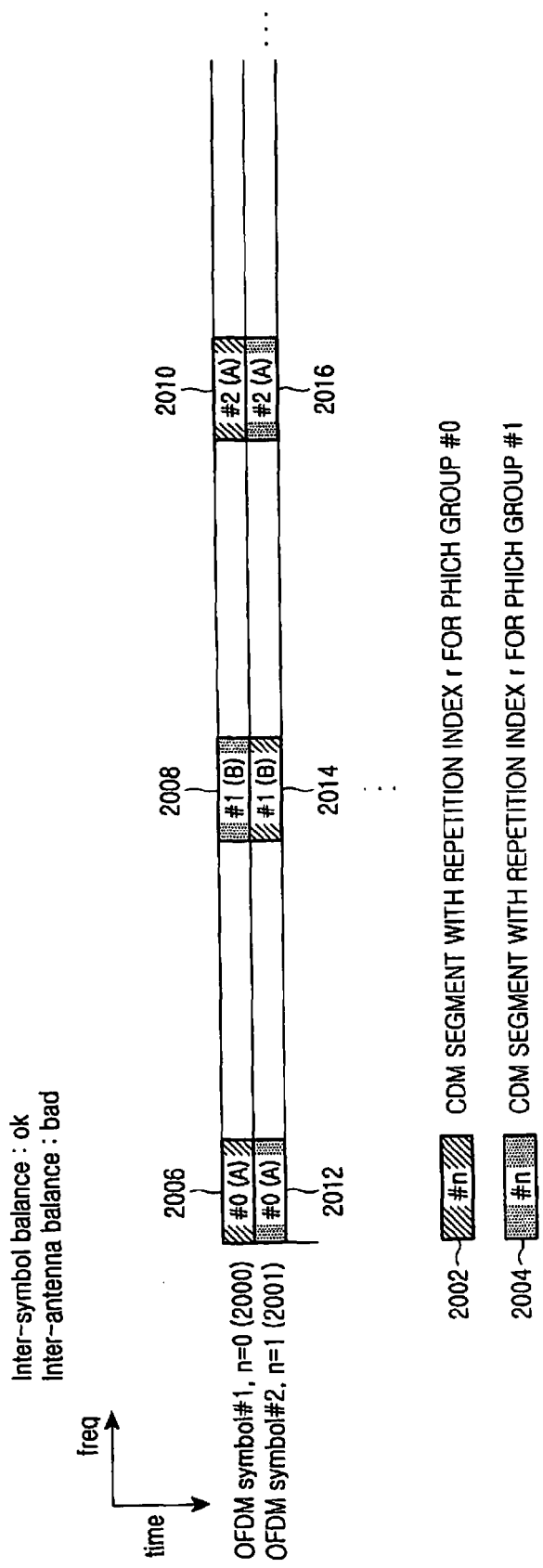
FIG. 20 is a diagram illustrating a method for mapping a PHICH group in a time-frequency domain in an SFBC scheme in which SF=4 and 4 transmit antennas are used, according to a sixth embodiment of the present invention.

Referring to FIG. 20, the horizontal axis represents the frequency domain, and the vertical axis represents the time domain. CDM segments included in one PHICH group are mapped to different zones in the frequency domain, and mapped within the OFDM symbol #1 and the OFDM symbol #2 in the time domain in a distributed manner. An index for identifying an OFDM symbol is denoted by n, where n=0, 1.

The first CDM segment (r=0) of a PHICH group g=0 (2002) is mapped to the OFDM symbol #1 (n=0) by applying the antenna mapping pattern A (2006), the second CDM segment (r=1) is mapped to the OFDM symbol #2 (n=1) by applying the antenna mapping pattern B (2014), and the third CDM segment (r=2) is mapped to the OFDM symbol #1 (n=0) by applying the antenna mapping pattern A (2010).

The first CDM segment (r=0) of a PHICH group g=1 (2004) is mapped to the OFDM symbol #2 (n=1) by applying the antenna mapping pattern A (2012), the second CDM segment (r=1) is mapped to the OFDM symbol #1 (n=0) by applying the antenna mapping pattern B (2008), and the third CDM segment (r=2) is mapped to the OFDM symbol #2 (n=1) by applying the antenna mapping pattern A (2016).

That is, for PHICH group g=0 and PHICH group g=1, their antenna mapping patterns for CDM segments are equally maintained as the A-B-A mapping (or B-A-B mapping), and their methods for mapping each CDM segment to an OFDM symbol in the time domain are maintained differently. Therefore, when 2 PHICH groups are mapped and transmitted, transmit power between antennas is uniformly distributed to some extent at an arbitrary time, and transmit power between OFDM symbols is maximally uniformly distributed.

The complexity of a mapping operation can be reduced by matching a frequency-domain location of each CDM segment in PHICH group g=1 to the predetermined frequency-domain location of each CDM segment of PHICH group g=0.

If there is a need to map and transmit more than a total of 2 PHICH groups, the added PHICH group(s) applies the mapping operation defined for PHICH groups g=0-1 so that the PHICH groups do not overlap each other in the time-frequency domain.

The foregoing mapping operation can be summarized as shown Table 3.

TABLE 3

| PHICH group g | CDM segment repetition index r | OFDM symbol index n | Antenna mapping pattern |
|---|---|---|---|
| 0 | 0 | 0 | A |
| 0 | 1 | 1 | B |
| 0 | 2 | 0 | A |
| 1 | 0 | 1 | A |
| 1 | 1 | 0 | B |
| 1 | 2 | 1 | A |
| ... | ... | ... | ... |

In Table 3, when the first CDM segment r=0 of a PHICH group g=0 is mapped to an OFDM symbol n=0 (when a start symbol of an OFDM symbol is defined as n=0), an OFDM symbol index n is mapped in order of [010, 101, . . . ]. When the first CDM segment r=0 of the PHICH group g=0 is mapped beginning at an OFDM symbol n=1 (when a start symbol of an OFDM symbol is defined as n=1), an OFDM symbol index n is mapped in reversed order of [101, 010, . . . ].

Information indicating which CDM segments the UE should monitor in order to receive the ACK/NACK signal from a Node B is implicitly notified by a mapping relation with scheduling control information or resources for UL data transmission without separate signaling, or notified by separate physical layer or upper layer signaling.

A detailed transmission/reception apparatus of the sixth embodiment is to the same as that of the first embodiment, so a description thereof will be omitted. However, the detailed parameters and methods for mapping resources for ACK/NACK transmission follow the assumptions made in the sixth embodiment. The sixth embodiment is similar to the fourth embodiment, however, in which the number of PHICH groups is 2.

In the PHICH mapping methods of the fourth and fifth embodiments, the mapping rules in the time-frequency domain can be mathematically generalized as expressed in Equation (3).

For mapping of PHICH belonging to a PHICH group g, an index $A_0(g,r)=A_0(g,0), A_0(g,1), \ldots, A_0(g,R-1)$ of a dummy CDM segment is determined such that it is located in the first OFDM symbol. Here, r (r=0, 1, . . . R−1) indicates a repetition index of a CDM segment. Based on the number, N (n=0, 1, . . . , N−1), of OFDM symbols on which PHICH is transmitted, the PHICH group index g, and the repetition index r of a CDM segment, the CDM segment to which PHICH is actually mapped becomes $A(g,r)=A(g,0)$, $A(g,1), \ldots, A(g,R-1)$, and $A(g,r)$ is calculated as Equation (3).

$$A(g,r)=A_0(g,r)+\text{mod}(\text{floor}(g/K),N) \qquad (3)$$

Here, K=2 for N=2, SF=4, and number of transmit antennas=4; K=4 for N=2, SF=2, and number of transmit antenna=4; and otherwise, K=1.

In Equation (3), mod (a, b) is a remainder obtained by dividing a by b.

For example, when this scheme is used, the operation illustrated in FIG. 16 is performed for K=2, and the operation of FIG. 19 is performed for K=4.

As is apparent from the foregoing description, the present invention transmits an HARQ ACK/NACK signal through at least one OFDM symbol in a distributed manner considering a predetermined repetition, thereby satisfying HARQ reliability. That is, in transmitting/receiving the HARQ ACK/NACK signal, the present invention obtains diversity gain against an interference signal, maintains orthogonality between multiplexed orthogonal signals, and provides diversity gain in the time-frequency domain. In addition, the present invention prevents the case where a particular OFDM symbol is power-overloaded, thereby contributing to improvement of the entire system performance of the mobile communication system supporting HARQ.

What is claimed is:

1. A method for a mobile communication system, the method comprising:
   generating at least one symbol group to which an orthogonal sequence is applied;
   determining one of a first antenna set and a second antenna set for mapping the generated at least one symbol group based on the a symbol group index and a physical hybrid automatic repeat request indicator channel (PHICH) group index;
   mapping the generated at least one symbol group to the determined antenna set; and
   transmitting the mapped at least one symbol group.

2. The method of claim 1, wherein the first antenna set comprises a first antenna and a third antenna, and the second antenna set comprises a second antenna and a fourth antenna.

3. The method of claim 1, wherein the first antenna set is determined for a first symbol group, and the second antenna set and the first antenna set are determined for a second symbol group and a third symbol group, respectively.

4. The method of claim 1, wherein the second antenna set is determined for a first symbol group, and the second antenna set and the first antenna set are determined for a second symbol group and a third symbol group, respectively.

5. The method of claim 1, wherein one of the first antenna set and the second antenna set is determined based on floor(PHICH group index/2), where the floor(a) indicates a maximum integer not greater than 'a'.

6. The method of claim 1, wherein a spreading factor of the orthogonal sequence is four (4) or two (2).

7. The method of claim 1, wherein the generated at least one symbol group is mapped to the determined antenna set using a space-frequency block coding (SFBC) scheme.

8. An apparatus for a mobile communication system, the apparatus comprising:
   a controller for generating at least one symbol group to which an orthogonal sequence is applied, determining one of a first antenna set and a second antenna set for mapping the at least one symbol group based on the a symbol group index and a physical hybrid automatic repeat request indicator channel (PHICH) group index, and mapping the generated at least one symbol group to the determined antenna set; and
   a transmitter for transmitting the mapped at least one symbol group.

9. The apparatus of claim 8, wherein the first antenna set comprises a first antenna and a third antenna, and the second antenna set comprises a second antenna and a fourth antenna.

10. The apparatus of claim 8, wherein the first antenna set is determined for a first symbol group, and the second antenna set and the first antenna set are determined for a second symbol group and a third symbol group, respectively.

11. The apparatus of claim 8, wherein the second antenna set is determined for a first symbol group, and the second antenna set and the first antenna set are determined for a second symbol group and a third symbol group, respectively.

12. The apparatus of claim 8, wherein one of the first antenna set and the second antenna set is determined based on floor(PHICH group index/2), where the floor(a) indicates a maximum integer not greater than 'a'.

13. The apparatus of claim 8, wherein a spreading factor of the orthogonal sequence is four (4) or two (2).

14. The apparatus of claim 8, wherein the generated at least one symbol group is mapped to the determined antenna set using a space-frequency block coding (SFBC) scheme.

* * * * *